(12) United States Patent
Wu et al.

(10) Patent No.: US 11,829,568 B2
(45) Date of Patent: Nov. 28, 2023

(54) TOUCH CONTROL STRUCTURE AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Chao Wu, Beijing (CN); Kaipeng Sun, Beijing (CN); Yuanyou Qiu, Beijing (CN); Yufei Huo, Beijing (CN); Meng Li, Beijing (CN); Yudiao Cheng, Beijing (CN); Pinchao Gu, Beijing (CN); Chao Zeng, Beijing (CN); Tianyi Cheng, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 280 days.

(21) Appl. No.: 17/419,679

(22) PCT Filed: Sep. 27, 2020

(86) PCT No.: PCT/CN2020/118087
§ 371 (c)(1),
(2) Date: Jun. 29, 2021

(87) PCT Pub. No.: WO2022/061808
PCT Pub. Date: Mar. 31, 2022

(65) Prior Publication Data
US 2022/0317814 A1    Oct. 6, 2022

(51) Int. Cl.
*G06F 3/044*    (2006.01)
(52) U.S. Cl.
CPC .......... *G06F 3/0446* (2019.05); *G06F 3/0443* (2019.05); *G06F 3/0448* (2019.05);
(Continued)

(58) Field of Classification Search
CPC .... G06F 3/0446; G06F 3/0443; G06F 3/0448; G06F 2203/04104; G06F 2203/04107;
(Continued)

(56) References Cited

U.S. PATENT DOCUMENTS

2018/0348933 A1    12/2018    Jun et al.
2020/0057529 A1    2/2020    Zhang
(Continued)

FOREIGN PATENT DOCUMENTS

| CN | 108984013 A | 12/2018 |
|---|---|---|
| CN | 109213372 A | 1/2019 |

(Continued)

OTHER PUBLICATIONS

International Search Report & Written Opinion dated Jun. 28, 2021, regarding PCT/CN2020/118087.
(Continued)

*Primary Examiner* — Temesghen Ghebretinsae
*Assistant Examiner* — Karin Kiyabu
(74) *Attorney, Agent, or Firm* — Intellectual Valley Law, P.C.

(57) ABSTRACT

A touch control structure is provided. The touch control structure includes a plurality of first mesh electrodes and a plurality of second mesh electrodes. The touch control structure is limited in a touch control region and absent in a window region surrounded by the touch control region. The touch control structure includes a plurality of window-adjacent mesh blocks and a plurality of capacitance-compensating conductive plates. A respective one of the plurality of capacitance-compensating plates is directly connected to at least one mesh line of a respective one of the plurality of window-adjacent mesh blocks. The plurality of capacitance-compensating plates respectively surround a plurality of portions of a periphery of the window region.

18 Claims, 20 Drawing Sheets

(52) U.S. Cl.
CPC .............. *G06F 2203/04104* (2013.01); *G06F 2203/04107* (2013.01); *G06F 2203/04111* (2013.01); *G06F 2203/04112* (2013.01)

(58) Field of Classification Search
CPC .. G06F 2203/04111; G06F 2203/04112; G06F 3/0412; G06F 3/04184
See application file for complete search history.

(56) References Cited

U.S. PATENT DOCUMENTS

| | | | |
|---|---|---|---|
| 2020/0098847 | A1 | 3/2020 | Zhang et al. |
| 2020/0142525 | A1 | 5/2020 | Han et al. |
| 2020/0183538 | A1 | 6/2020 | Li et al. |
| 2021/0149525 | A1 | 5/2021 | Xu et al. |
| 2021/0357079 | A1 | 11/2021 | Song et al. |
| 2021/0397320 | A1* | 12/2021 | Ye .................. G06F 3/04164 |
| 2022/0190043 | A1* | 6/2022 | Ge .................. H10K 50/86 |
| 2022/0350446 | A1* | 11/2022 | Song .................. G06F 3/0443 |
| 2022/0384533 | A1* | 12/2022 | Jang .................. H10K 59/121 |

FOREIGN PATENT DOCUMENTS

| | | |
|---|---|---|
| CN | 109360837 A | 2/2019 |
| CN | 109545085 A | 3/2019 |
| CN | 110007804 A | 7/2019 |
| CN | 110837314 A | 2/2020 |
| CN | 110874160 A | 3/2020 |
| CN | 110968220 A | 4/2020 |
| CN | 111158514 A | 5/2020 |
| CN | 111708461 A | 9/2020 |
| WO | 2020080740 A1 | 4/2020 |

OTHER PUBLICATIONS

First Office Action in the Chinese Patent Application No. 202180002458.9, dated May 27, 2023; English translation attached.

* cited by examiner

TOUCH CONTROL STRUCTURE AND DISPLAY APPARATUS

CROSS-REFERENCE TO RELATED APPLICATION

This application is a national stage application under 35 U.S.C. § 371 of International Application No. PCT/CN2020/118087, filed Sep. 27, 2020, the contents of which are incorporated by reference in the entirety.

TECHNICAL FIELD

The present invention relates to display technology, more particularly, to a touch control structure and a display apparatus.

BACKGROUND

Various types of touch panels have been developed. Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

In one aspect, the present disclosure provides a touch control structure, comprising a plurality of first mesh electrodes and a plurality of second mesh electrodes; wherein the touch control structure is limited in a touch control region and absent in a window region surrounded by the touch control region; the touch control structure comprises a plurality of window-adjacent mesh blocks and a plurality of capacitance-compensating conductive plates; a respective one of the plurality of capacitance-compensating plates is directly connected to at least one mesh line of a respective one of the plurality of window-adjacent mesh blocks; and the plurality of capacitance-compensating plates respectively surround a plurality of portions of a periphery of the window region.

Optionally, an occupied area of the respective one of the plurality of capacitance-compensating plates is correlated to a reduction in an occupied area of the respective one of the plurality of window-adjacent mesh blocks relative to an internal mesh block electrically connected to the respective one of the plurality of window-adjacent mesh blocks, the internal mesh block spaced apart from the window region by the respective one of the plurality of window-adjacent mesh blocks.

Optionally, a ratio of occupied areas of respective two of the plurality of capacitance-compensating conductive plates is within 50% of a ratio of reductions in occupied areas of respective two of the plurality of window-adjacent mesh blocks respectively connected to the respective two of the plurality of capacitance-compensating conductive plates; the reductions in occupied areas are respectively relative to respective two internal mesh blocks respectively electrically connected to the respective two of the plurality of window-adjacent mesh blocks; and the two internal mesh blocks are respectively spaced apart from the window region respectively by the respective two of the plurality of window-adjacent mesh blocks.

Optionally, the plurality of window-adjacent mesh blocks comprise one or more first type window-adjacent mesh blocks that are parts of the plurality of first mesh electrodes, and one or more second type window-adjacent mesh blocks that are parts of the plurality of second mesh electrodes; and the plurality of capacitance-compensating plates comprise one or more first type capacitance-compensating plates respectively connected to the one or more first type window-adjacent mesh blocks, and one or more second type capacitance-compensating plates respectively connected to the one or more second type window-adjacent mesh blocks.

Optionally, an occupied area of the respective one of the plurality of capacitance-compensating plates is correlated to a reduction in an occupied area of the respective one of the plurality of window-adjacent mesh blocks; the reduction in the occupied area with respect to a respective one of the one or more first type window-adjacent mesh blocks is a difference between an occupied area of the respective one of the one or more first type window-adjacent mesh blocks and an average occupied area of mesh blocks of the plurality of first mesh electrodes that are spaced apart from the window region and edges of the touch control structure; and the reduction in the occupied area with respect to a respective one of the one or more second type window-adjacent mesh blocks is a difference between an occupied area of the respective one of the one or more second type window-adjacent mesh blocks and an average occupied area of mesh blocks of the plurality of second mesh electrodes that are spaced apart from the window region and edges of the touch control structure.

Optionally, a ratio of occupied areas of respective two of the plurality of capacitance-compensating conductive plates is within 50% of a ratio of reductions in occupied areas of respective two of the plurality of window-adjacent mesh blocks respectively connected to the respective two of the plurality of capacitance-compensating conductive plates; a reduction in the occupied area with respect to a respective one of the one or more first type window-adjacent mesh blocks is a difference between an occupied area of the respective one of the one or more first type window-adjacent mesh blocks and an average occupied area of mesh blocks of the plurality of first mesh electrodes that are spaced apart from the window region and edges of the touch control structure; and a reduction in the occupied area with respect to a respective one of the one or more second type window-adjacent mesh blocks is a difference between an occupied area of the respective one of the one or more second type window-adjacent mesh blocks and an average occupied area of mesh blocks of the plurality of second mesh electrodes that are spaced apart from the window region and edges of the touch control structure.

Optionally, the plurality of window-adjacent mesh blocks comprise a first mesh block surrounding a first portion of the periphery of the window region and a second mesh block surrounding a second portion of the periphery of the window region; the first portion and the second portion are sequential non-overlapping portions of the periphery of the window region; the plurality of capacitance-compensating conductive plates comprise a first capacitance-compensating conductive plate directly connected to at least one mesh line of the first mesh block and spaced apart from the second mesh block; the first capacitance-compensating conductive plate surrounds a third portion of the periphery of the window region; and the third portion at least partially overlaps with the first portion and at least partially overlaps with the second portion.

Optionally, the touch control structure further comprises a plurality of mesh fill patterns; wherein the plurality of mesh fill patterns comprises a window-adjacent mesh fill pattern surrounding a fourth portion of the periphery of the window region.

Optionally, the window-adjacent mesh fill pattern is surrounded by the second mesh blocks on sides other than a side surrounding the fourth portion of the periphery of the window region; the third portion at least partially overlaps with the fourth portion; and the first portion, the second portion, and the fourth portion are sequential non-overlapping portions of the periphery of the window region.

Optionally, the second mesh block further surrounds a fifth portion of the periphery of the window region; the first portion, the second portion, the fourth portion, and the fifth portion are sequential non-overlapping portions of the periphery of the window region; the third portion is non-overlapping with the fifth portion; the plurality of capacitance-compensating conductive plates further comprise a second capacitance-compensating conductive plate directly connected to at least one mesh line of the second mesh block; and the second capacitance-compensating conductive plate surrounds the fifth portion of the periphery of the window region.

Optionally, the plurality of window-adjacent mesh blocks comprise a third mesh block surrounding a sixth portion of the periphery of the window region and a fourth mesh block surrounding a seventh portion of the periphery of the window region; the plurality of capacitance-compensating conductive plates comprise a third capacitance-compensating conductive plate directly connected to at least one mesh line of the third mesh block and directly connected to at least one mesh line of the fourth mesh block; the third capacitance-compensating conductive plate surrounds an eighth portion of the periphery of the window region; and the eighth portion at least partially overlaps with the sixth portion and at least partially overlaps with the seventh portion.

Optionally, the touch control structure further comprises a first dummy plate surrounding the seventh portion of the periphery of the window region; wherein the first dummy plate is spaced apart from the fourth mesh block and spaced apart from the third capacitance-compensating conductive plate; and a ninth portion of the periphery of the window region, where the seventh portion and the eighth portion overlap with each other, is surrounded by a part of the first dummy plate, and is also surrounded by a part of the third capacitance-compensating conductive plate.

Optionally, the plurality of window-adjacent mesh blocks comprise a fifth mesh block surrounding a tenth portion of the periphery of the window region; the seventh portion, the tenth portion, and the sixth portion are sequential non-overlapping portions of the periphery of the window region; the tenth portion is a sub-portion of the eighth portion; and the fifth mesh block is spaced apart from the third capacitance-compensating conductive plate surrounding the tenth portion.

Optionally, the plurality of window-adjacent mesh blocks comprise a first mesh block surrounding a first portion of the periphery of the window region and a fifth mesh block surrounding a tenth portion of the periphery of the window region; and the touch control structure further comprises a conductive bridge directly connected to the first mesh block and directly connected to the fifth mesh block.

Optionally, the touch control structure further comprises a touch insulating layer between the first mesh block and the conductive bridge, and between the fifth mesh block and the conductive bridge; the first mesh block and the fifth mesh block are in a same layer; and the conductive bridge extends respectively through vias in the touch insulating layer to respectively connected to mesh lines of the first mesh block and the fifth mesh block.

Optionally, the conductive bridge surrounds an eleventh portion of the periphery of the window region; and the eleventh portion partially overlaps with the first portion, and at least partially overlaps with the tenth portion.

Optionally, the plurality of window-adjacent mesh blocks comprise a sixth mesh block surrounding a twelfth portion of the periphery of the window region; the plurality of capacitance-compensating conductive plates comprise a fourth capacitance-compensating conductive plate directly connected to at least one mesh line of the sixth mesh block; the fourth capacitance-compensating conductive plate surrounds a thirteenth portion of the periphery of the window region; the touch control structure further comprises a second dummy plate surrounding a fourteenth portion of the periphery of the window region; the second dummy plate is spaced apart from the sixth mesh block; and the thirteen portion and the fourteen portion are sub-portions of the twelfth portion.

Optionally, the touch control structure further comprises a light shielding ring between the window region and the plurality of capacitance-compensating plates; wherein the light shielding ring substantially surrounds the periphery of the window region.

Optionally, the plurality of window-adjacent mesh blocks comprise a second mesh block on a first side of the window region, a third mesh block on a second side of the window region, a first mesh block on a third side of the window region, and a sixth mesh block on a fourth side of the window region; the plurality of capacitance-compensating conductive plates comprise a second capacitance-compensating conductive plate on the first side of the window region, a third capacitance-compensating conductive plate on the second side of the window region, a first capacitance-compensating conductive plate on the third side of the window region, and a fourth capacitance-compensating conductive plate on the fourth side of the window region; the second capacitance-compensating conductive plate is directly connected to at least one mesh line of the second mesh block; the third capacitance-compensating conductive plate is directly connected to at least one mesh line of the third mesh block; the first capacitance-compensating conductive plate is directly connected to at least one mesh line of the first mesh block; and the fourth capacitance-compensating conductive plate is directly connected to at least one mesh line of the sixth mesh block.

Optionally, the first capacitance-compensating conductive plate has an occupied area in a range of $1.0 \times 10^6$ $\mu m^2$ to $1.2 \times 10^6$ $\mu m^2$, the second capacitance-compensating conductive plate has an occupied area in a range of $3.0 \times 10^5$ $\mu m^2$ to $4.0 \times 10^5$ $\mu m^2$, the third capacitance-compensating conductive plate has an occupied area in a range of $9.0 \times 10^5$ $\mu m^2$ to $1.1 \times 10^6$ $\mu m^2$, and the fourth capacitance-compensating conductive plate has an occupied area in a range of $3 \times 10^5$ $\mu m^2$ to $5.0 \times 10^5$ $\mu m^2$.

Optionally, a respective one of the plurality of capacitance-compensating conductive plates has a plate width along a direction perpendicular to an interface between the respective one of the plurality of capacitance-compensating conductive plates and a mesh block electrically connected to the respective one of the plurality of capacitance-compensating conductive plates; the plate width is in a range of 200 $\mu m$ to 300 $\mu m$; a mesh line of the mesh block has a line width in a range of 1 µm to 5 µm; and a ratio between the plate width and the line width is greater than 10:1.

In another aspect, the present disclosure provides a display apparatus, comprising the touch control structure described herein or fabricated by a method described herein, a display panel with a hole in the window region, and an integrated circuit connected to the display panel; wherein display elements of the display panel are absent in the window region; and the display panel is configured to display an image in at least a portion of the touch control region.

Optionally, the display apparatus comprises, in the window region, an inter-layer dielectric layer; a passivation layer on the inter-layer dielectric layer; a first planarization layer on a side of the passivation layer away from the inter-layer dielectric layer; a second planarization layer on a side of the first planarization layer away from the passivation layer; a pixel definition layer on a side of the second planarization layer away from the first planarization layer; a window overcoat layer on a side of the pixel definition layer away from the second planarization layer; and a touch insulating layer on a side of the window overcoat layer away from the pixel definition layer.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a touch control structure and a display apparatus that substantially obviate one or more of the problems due to limitations and disadvantages of the related art. In one aspect, the present disclosure provides a touch control structure. In some embodiments, the touch control structure includes a plurality of first mesh electrodes and a plurality of second mesh electrodes. The touch control structure is limited in a touch control region and absent in a window region surrounded by the touch control region. Optionally, the touch control structure includes a plurality of window-adjacent mesh blocks and a plurality of capacitance-compensating conductive plates. Optionally, a respective one of the plurality of capacitance-compensating plates is directly connected to at least one mesh line of a respective one of the plurality of window-adjacent mesh blocks. Optionally, the plurality of capacitance-compensating plates respectively surround a plurality of portions of a periphery of the window region.

Mesh electrodes includes mesh lines typically have a line width in a range of 1 µm to 50 µm. Thus, connecting adjacent mesh blocks through the mesh lines is particularly difficult, and often resulting in poor connectivity. The present disclosure adopts a novel and advantageous touch electrode design that obviate issues in related touch control structures.

Figure 1A:
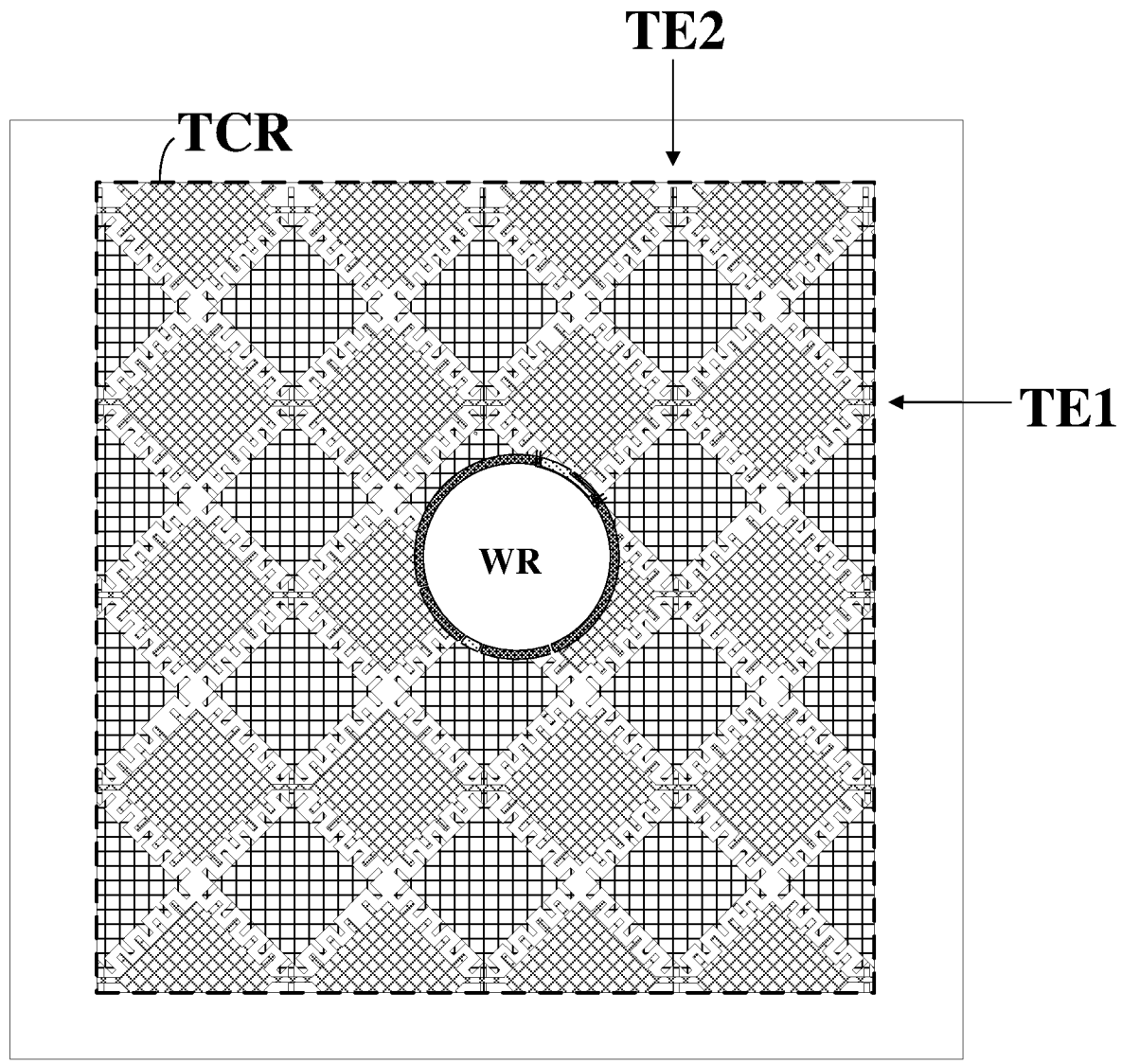
FIG. 1A is a schematic diagram illustrating a touch control structure in some embodiments according to the present disclosure.

FIG. 1 is a schematic diagram illustrating a touch control structure in some embodiments according to the present disclosure. Referring to FIG. 1, the touch control structure in some embodiments includes a plurality of first mesh electrodes TE1 and a plurality of second mesh electrodes TE2. Optionally, the touch control structure is a mutual capacitance type touch control structure. Optionally, the plurality of first mesh electrodes TE1 are a plurality of touch scanning electrodes, and the plurality of second mesh electrodes TE2 are a plurality of touch sensing electrodes. Optionally, the plurality of mesh touch electrodes TE1 are a plurality of touch sensing electrodes, and the plurality of second mesh electrodes TE2 are a plurality of touch scanning electrodes. The touch control structure is limited in a touch control region TCR and absent in a window region WR surrounded by the touch control region TCR. For example, the touch control structure may be a touch control structure in a display panel, where the touch control region TCR substantially overlaps with a display region of the display panel, and the window region WR is a region in the display panel having a hole configured for installing an accessory such as a camera lens or a fingerprint sensor. The display panel is configured to display an image in at least a portion of the touch control region TCR. In one example, in the window region WR, display elements of the display panel and the touch control structure are absent; in the display region or at least a portion of the touch control region TCR, both display elements of the display panel and the touch control structure are present.

Referring to FIG. 1, in some embodiments, the plurality of mesh touch electrodes TE1 are arranged in a plurality of rows, each of which is a respective one of the plurality of mesh touch electrodes TE1; the plurality of second mesh electrodes TE2 are arranged in a plurality of columns, each of which is a respective one of the plurality of second mesh electrodes TE2.

Figure 1B:
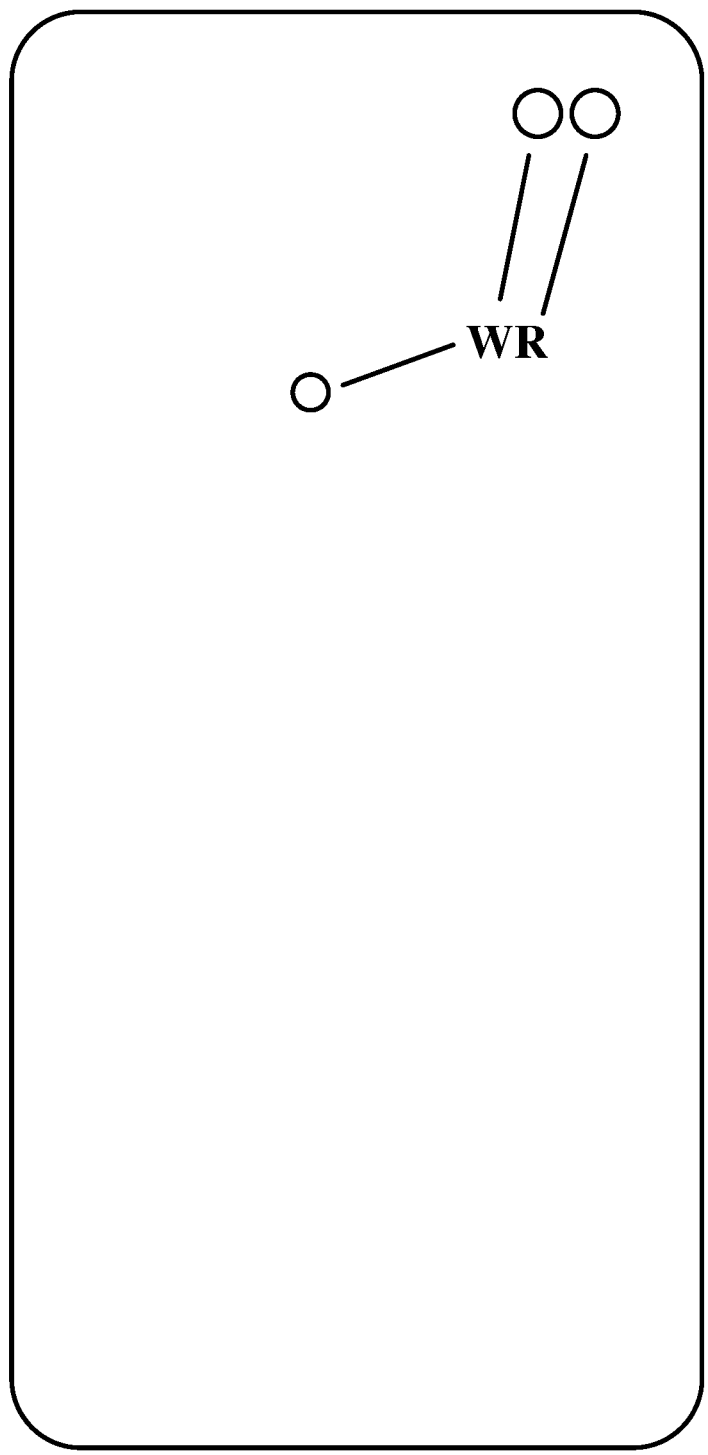
FIG. 1B illustrates several exemplary positions for having a window region in a display panel in some embodiments according to the present disclosure.

FIG. 1B illustrates several exemplary positions for having a window region in a display panel in some embodiments according to the present disclosure. The display panel may have a hole configured for installing an accessory such as a camera lens or a fingerprint sensor in the window region WR. In some embodiments, the hole is a blind hole that does not completely extends through at least one layer of the display panel. In some embodiments, the hole is a through-hole that completely extends through the display panel.

Figure 2A:
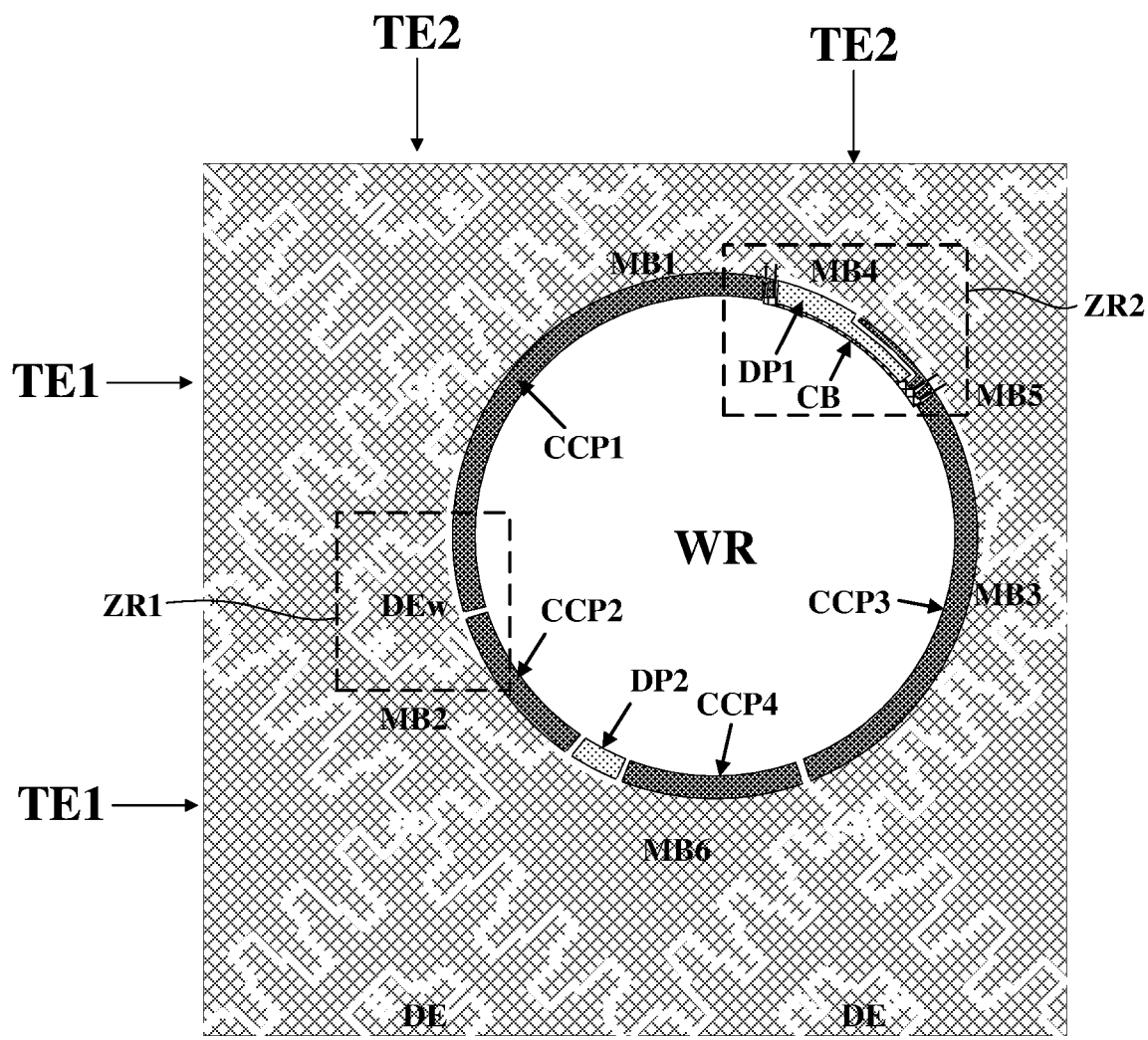
FIG. 2A is a partial view of the structure of a touch control structure around a window region in some embodiments according to the present disclosure.

FIG. 2A is a partial view of the structure of a touch control structure around a window region in some embodiments according to the present disclosure. Referring to FIG. 2A, the touch control structure in some embodiments includes a plurality of window-adjacent mesh blocks (e.g., a first mesh block MB1, a second mesh block MB2, a third mesh block MB3, a sixth mesh block MB6) and a plurality of capacitance-compensating conductive plates (e.g., a first capacitance-compensating conductive plate CCP1, a second capacitance-compensating conductive plate CCP2, a third capacitance-compensating conductive plate CCP3, and a fourth capacitance-compensating conductive plate CCP4). The plurality of capacitance-compensating plates respectively surround a plurality of portions of a periphery of the window region WR. The plurality of capacitance-compensating plates are parts of a ring structure that substantially surrounds the periphery of the window region WR. As used herein the term "substantially surrounding" refers to surrounding at least 50% (e.g., at least 60, at least 70, at least 80, at least 90, at least 95, at least 99, and 100%) of a perimeter of an area. A respective one of the plurality of capacitance-compensating plates is directly connected to at least one mesh line (e.g., multiple mesh lines) of a respective one of the plurality of window-adjacent mesh blocks. For example, in FIG. 2A, the first capacitance-compensating conductive plate CCP1 is directly connected to at least one mesh line (e.g., multiple mesh lines) of the first mesh block MB1; the second capacitance-compensating conductive plate CCP2 is directly connected to at least one mesh line (e.g., multiple mesh lines) of the second mesh block MB2; the third capacitance-compensating conductive plate CCP3 is directly connected to at least one mesh line (e.g., multiple mesh lines) of the third mesh block MB3; and the fourth capacitance-compensating conductive plate CCP4 is directly connected to at least one mesh line (e.g., multiple mesh lines) of the sixth mesh block MB6.

Figure 2B:
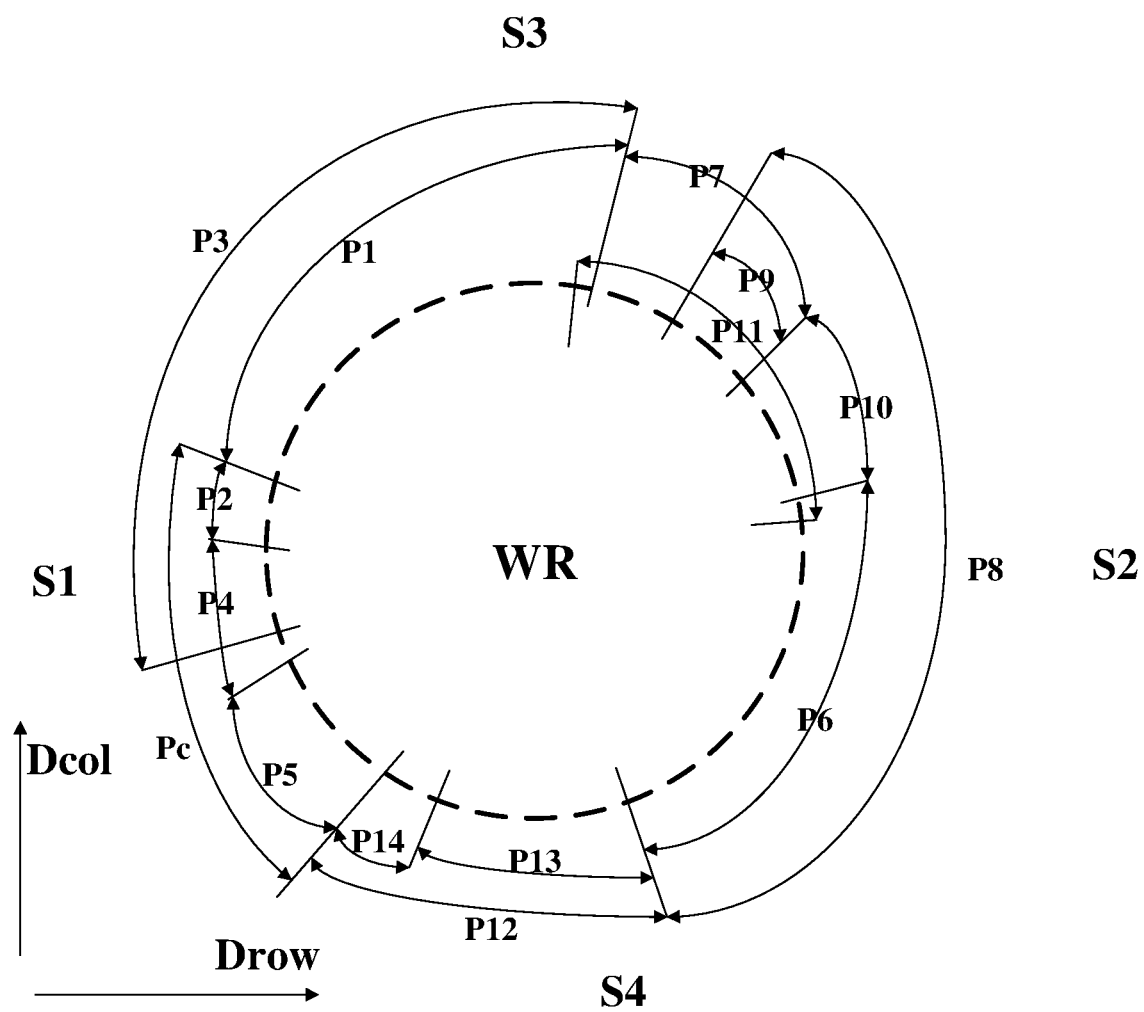
FIG. 2B illustrates various portions of a periphery of a window region in a touch control structure in some embodiments according to the present disclosure.

FIG. 2B illustrates various portions of a periphery of a window region in a touch control structure in some embodiments according to the present disclosure. Referring to FIG. 2A and FIG. 2B, in some embodiments, the plurality of window-adjacent mesh blocks include a first mesh block MB1 surrounding a first portion P1 of the periphery of the window region WR and a second mesh block MB2 surrounding a second portion P2 of the periphery of the window region WR. The first portion P1 and the second portion P2 are sequential non-overlapping portions of the periphery of the window region WR. In some embodiments, the plurality of capacitance-compensating conductive plates include a first capacitance-compensating conductive plate CCP1 directly connected to at least one mesh line (e.g., multiple mesh lines) of the first mesh block MB1 (e.g., along the first portion P1) and spaced apart from the second mesh block MB2 (e.g., along the second portion P2).

In some embodiments, the first capacitance-compensating conductive plate CCP1 surrounds at least a fraction of the first portion P1. The exact extent of the first capacitance-compensating conductive plate CCP1 may be determined, for example, based on the value of capacitance needed to compensate the capacitance of the first mesh block MB1. For example, a width or a length or an area of the first capacitance-compensating conductive plate CCP1 may be determined based on the value of capacitance needed to compensate the capacitance of the first mesh block MB1. In one example, the first capacitance-compensating conductive plate CCP1 surrounds a first portion P1 of the periphery of the window region WR. In another example, the first capacitance-compensating conductive plate CCP1 surrounds a third portion P3 of the periphery of the window region WR. The third portion P3 at least partially overlaps with the first portion P1 and at least partially overlaps with the second portion P2. As shown in FIG. 2B, the first portion P1 and the second portion P2 are sub-portions of the third portion P3. In some embodiments, the third portion P3 at least partially overlaps with the first portion P1.

In some embodiments, the touch control structure further includes a plurality of mesh fill patterns DE. Optionally, a respective one of the plurality of mesh fill patterns DE is a fill pattern internal to a mesh block of a touch electrode. In one example, the respective one of the plurality of mesh fill patterns DE is surrounded by a mesh block, and spaced apart from the surrounding mesh block. The respective one of the plurality of mesh fill patterns DE is insulated from the surrounding mesh block, e.g., the respective one of the plurality of mesh fill patterns DE is floating.

Figure 3:
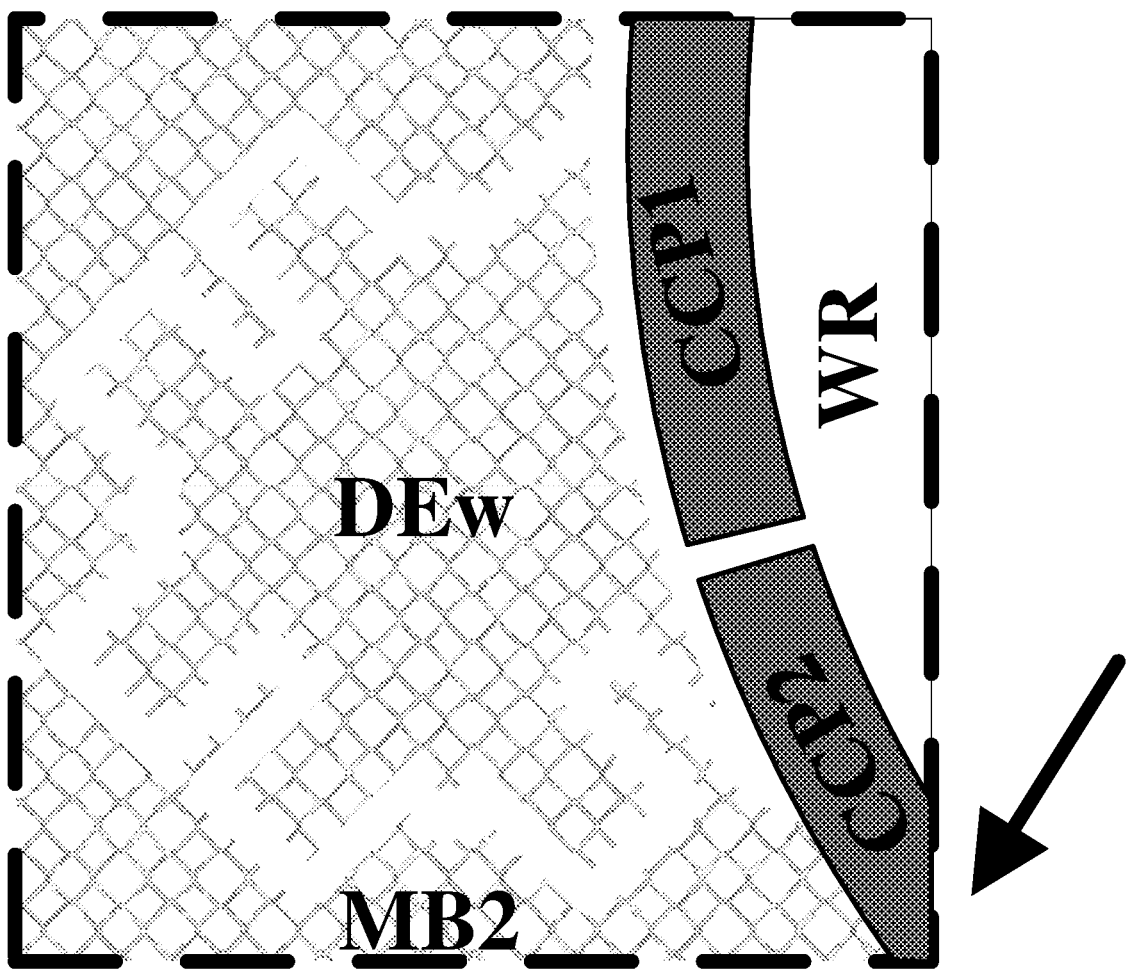
FIG. 3 is a zoom-in view of a first zoom-in region in FIG. 2A.

FIG. 3 is a zoom-in view of a first zoom-in region in FIG. 2A. Referring to FIG. 2A, FIG. 2B, and FIG. 3, the plurality of mesh fill patterns DE in some embodiments includes a window-adjacent mesh fill pattern DEw surrounding a fourth portion P4 of the periphery of the window region WR. The window-adjacent mesh fill pattern DEw is surrounded by the second mesh blocks MB2 on sides other than a side surrounding the fourth portion P4 of the periphery of the window region WR. The third portion P3 at least partially overlaps with the fourth portion P4. The first portion P1, the second portion P2, and the fourth portion P4 are sequential non-overlapping portions of the periphery of the window region WR.

Referring to FIG. 2A, FIG. 2B, and FIG. 3, in some embodiments the second mesh block MB2 further surrounds a fifth portion P5 of the periphery of the window region WR. The first portion P1, the second portion P2, the fourth portion P4, and the fifth portion P5 are sequential non-overlapping portions of the periphery of the window region WR. The third portion P3 is non-overlapping with the fifth portion P5. In some embodiments, the plurality of capacitance-compensating conductive plates further includes a second capacitance-compensating conductive plate CCP2 directly connected to at least one mesh line (e.g., multiple mesh lines) of the second mesh block MB2.

In some embodiments, the second mesh block MB2 and the window-adjacent mesh fill pattern DEw surround a combined portion Pc of the periphery of the window region WR. In some embodiments, the second capacitance-compensating conductive plate CCP2 surrounds at least a fraction of the combined portion Pc. The exact extent of the second capacitance-compensating conductive plate CCP2 may be determined, for example, based on the value of capacitance needed to compensate the capacitance of the second mesh block MB2. For example, a width or a length or an area of the second capacitance-compensating conductive plate CCP2 may be determined based on the value of capacitance needed to compensate the capacitance of the second mesh block MB2. In one example, the second capacitance-compensating conductive plate CCP2 surrounds the second portion P2 of the periphery of the window region WR. In another example, the second capacitance-compensating conductive plate CCP2 surrounds the fifth portion P5 of the periphery of the window region WR. In another example, the second capacitance-compensating conductive plate CCP2 surrounds the fourth portion P4 of the periphery of the window region WR. The combined portion Pc at least partially overlaps with the second portion P2 and at least partially overlaps with the fifth portion P5. In some embodiments, the combined portion Pc at least partially overlaps with the fourth portion P4.

In some embodiments, the plurality of window-adjacent mesh blocks include a third mesh block MB3 surrounding a sixth portion P6 of the periphery of the window region WR and a fourth mesh block MB4 surrounding a seventh portion P7 of the periphery of the window region WR. The sixth portion P6 and the seventh portion P7 are sequential non-overlapping portions of the periphery of the window region WR. In some embodiments, the plurality of capacitance-compensating conductive plates include a third capacitance-compensating conductive plate CCP3 directly connected to at least one mesh line (e.g., multiple mesh lines) of the third mesh block MB3 and directly connected to at least one mesh line (e.g., multiple mesh lines) of the fourth mesh block MB4. The third capacitance-compensating conductive plate CCP3 connects the third mesh block MB3 and the fourth mesh block MB4 together, thereby forming a pathway for touch signals along a column direction Dcol across the window region WR. The third capacitance-compensating conductive plate CCP3 surround an eighth portion P8 of the periphery of the window region WR. The eighth portion P8 at least partially overlaps with the sixth portion P6 and at least partially overlaps with the seventh portion P7. As shown in FIG. 2B, in some embodiments, the sixth portion P6 is a sub-portion of the eighth portion P8. The seventh portion P7 partially overlaps with the eighth portion P8, and is partially non-overlapping with the eighth portion P8.

Figure 4:
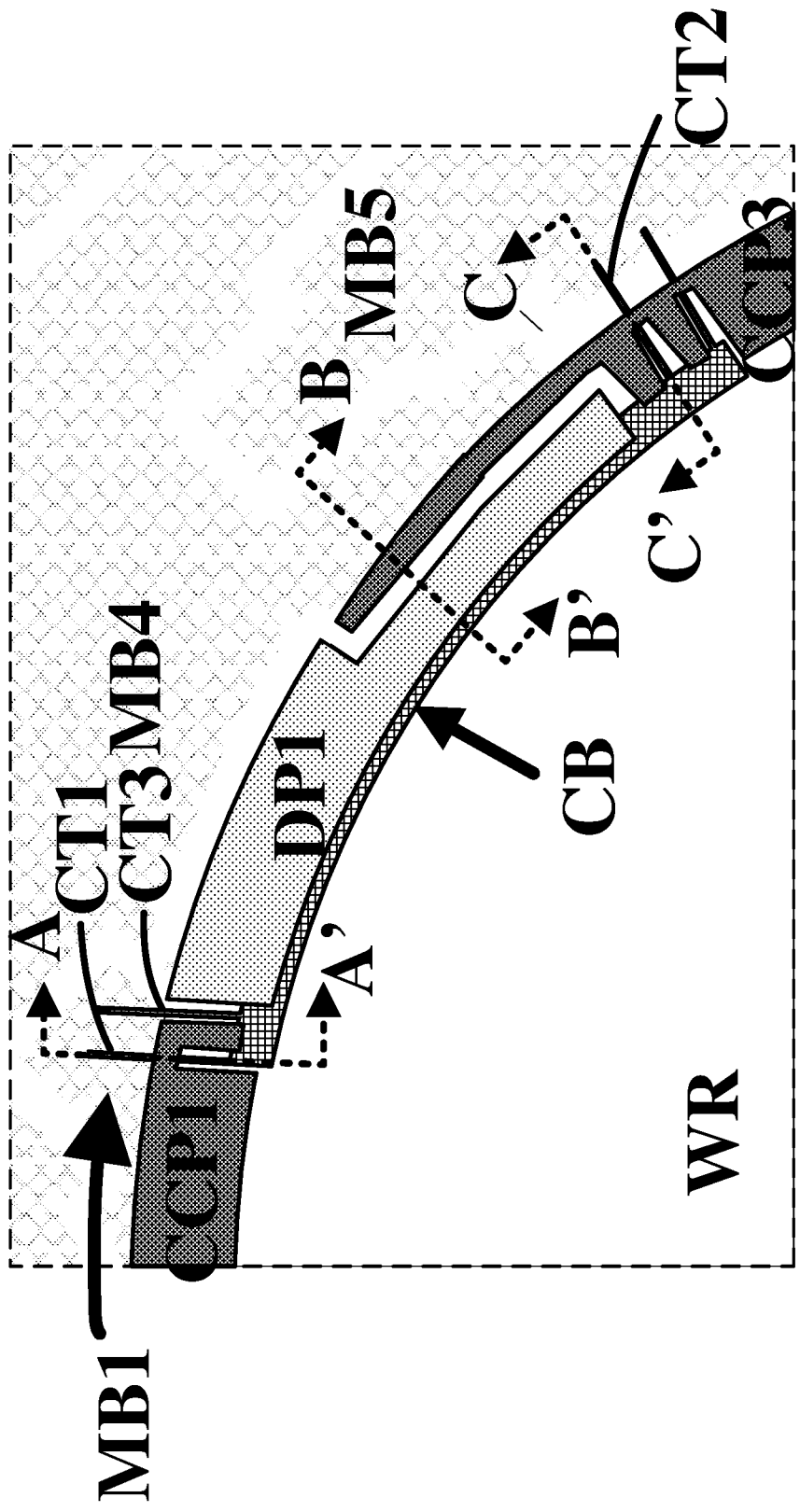
FIG. 4 is a zoom-in view of a second zoom-in region in FIG. 2A.
Figure 5A:
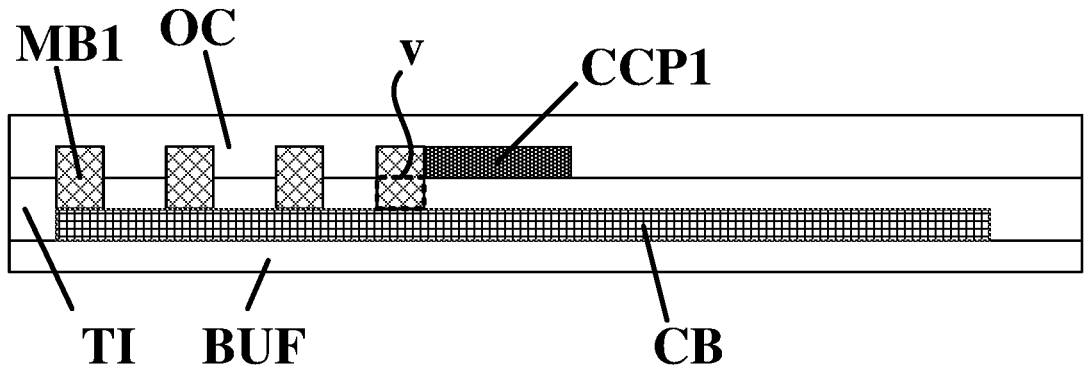
FIG. 5A is a cross-sectional view along an A-A' line in FIG. 4.
Figure 5B:
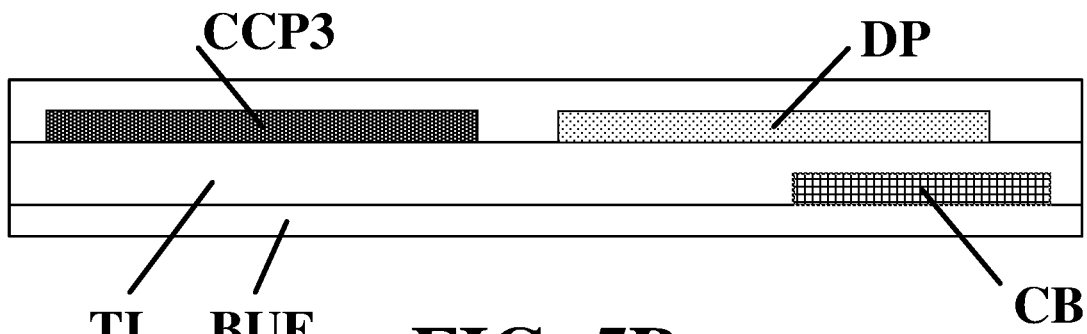
FIG. 5B is a cross-sectional view along a B-B' line in FIG. 4.
Figure 5C:
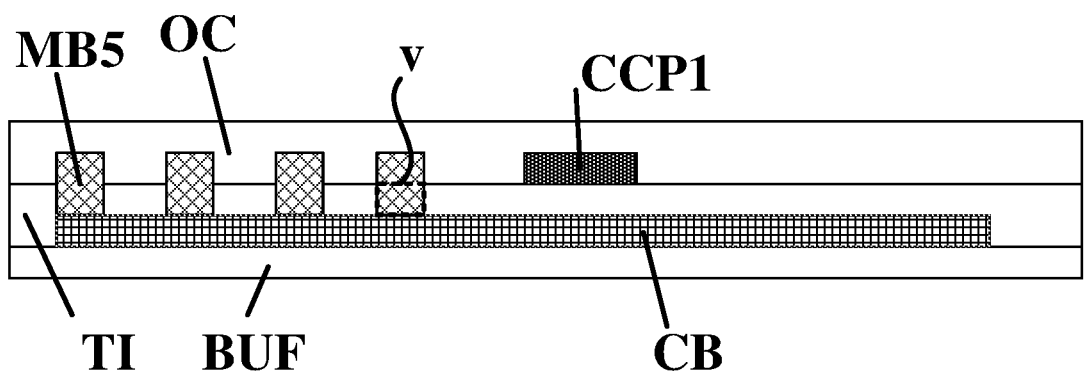
FIG. 5C is a cross-sectional view along a C-C' line in FIG. 4.

FIG. 4 is a zoom-in view of a second zoom-in region in FIG. 2A. FIG. 5A is a cross-sectional view along an A-A' line in FIG. 4, FIG. 5B is a cross-sectional view along a B-B' line in FIG. 4. FIG. 5C is a cross-sectional view along a C-C' line in FIG. 4. Referring to FIG. 2A, FIG. 2B, FIG. 4, and FIG. 5A to FIG. 5C, in some embodiments, the touch control structure further includes a first dummy plate DP1 surrounding the seventh portion P7 of the periphery of the window region WR. The first dummy plate DP1 is spaced apart from the fourth mesh block MB4 and spaced apart from the third capacitance-compensating conductive plate CCP3. The first dummy plate DP1 is insulated from the fourth mesh block MB4 and insulated from the third capacitance-compensating conductive plate CCP3. e.g., the first dummy plate DP1 is floating. A ninth portion P9 of the periphery of the window region, where the seventh portion P7 and the eighth portion P8 overlap with each other, is surrounded by a part of the first dummy plate DP1, and is also surrounded by a part of the third capacitance-compensating conductive plate CCP3.

In some embodiments, the plurality of window-adjacent mesh blocks include a fifth mesh block MB5 surrounding a tenth portion P10 of the periphery of the window region WR. Optionally, the seventh portion P7, the tenth portion P10, and the sixth portion P6 are sequential non-overlapping portions of the periphery of the window region WR. As shown in FIG. 2B, in one example, the tenth portion P10 is a sub-portion of the eighth portion P8. In another example, the sixth portion P6, the ninth portion P9, and the tenth portion P10 are respectively sub-portions of the eighth portion P8. The fifth mesh block MB5 is spaced apart from the third capacitance-compensating conductive plate CCP3 surrounding the tenth portion P10.

Referring to FIG. 2A, FIG. 2B, FIG. 4, and FIG. 5A to FIG. 5C again, in some embodiments, the touch control structure further includes a conductive bridge CB directly connected to the first mesh block MB1 and directly connected to the fifth mesh block MB5. The conductive bridge CB connects the first mesh block MB1 and the fifth mesh block MB5 together, thereby forming a pathway for touch signals along a row direction Drow across the window region WR. The touch control structure further includes a touch insulating layer TI between the first mesh block MB1 and the conductive bridge CB, and between the fifth mesh block MB5 and the conductive bridge CB. As shown in FIG. 5A to FIG. 5C, in one example, the first mesh block MB1 and the fifth mesh block MB5 are in a same layer. The conductive bridge CB extends respectively through vias v in the touch insulating layer TI to respectively connected to mesh lines of the first mesh block MB1 and the fifth mesh block MB5. As used herein, the row direction Drow and the column direction Dcol are two non-parallel directions, for example, the row direction Drow and the column direction Dcol cross over each other. Optionally, the row direction Drow and the column direction Dcol are perpendicular to each other. Optionally, the row direction Drow and the column direction Dcol cross over each other at an inclined angle that is not 90 degrees.

As used herein, the term "same layer" refers to the relationship between the layers simultaneously formed in the same step. In one example, the first mesh block MB1 and the fifth mesh block MB5 are in a same layer when they are formed as a result of one or more steps of a same patterning process performed in a material deposited in a same deposition process. In another example, the first mesh block MB1 and the fifth mesh block MB5 are in a same layer can be formed in a same layer by simultaneously performing the step of forming the first mesh block MB1 and the step of forming the fifth mesh block MB5. The term "same layer" does not always mean that the thickness of the layer or the height of the layer in a cross-sectional view is the same.

In some embodiments, the conductive bridge CB surrounds an eleventh portion P11 of the periphery of the window region WR. The eleventh portion P11 partially overlaps with the first portion P1, and at least partially overlaps with the tenth portion P10. As shown in FIG. 2B, in one example, the tenth portion P10 is a sub-portion of the eleventh portion P11. In another example, the seventh portion P7, the ninth portion P9, and the tenth portion P10 are respective sub-portions of the eleventh portion P11.

In some embodiments, the plurality of window-adjacent mesh blocks include a sixth mesh block MB6 surrounding a twelfth portion P12 of the periphery of the window region WR. Optionally, the plurality of capacitance-compensating conductive plates include a fourth capacitance-compensating conductive plate CCP4 directly connected to at least one mesh line (e.g., multiple mesh lines) of the sixth mesh block MB6. The fourth capacitance-compensating conductive plate CCP4 surrounds a thirteenth portion P13 of the periphery of the window region WR. In some embodiments, the touch control structure further includes a second dummy plate DP2 surrounding a fourteenth portion P14 of the periphery of the window region WR. The second dummy plate DP2 is spaced apart from the sixth mesh block MB6. For example, the second dummy plate DP2 is insulated from the sixth mesh block MB6, and is floating. The thirteen portion P13 and the fourteen portion P14 are sub-portions of the twelfth portion P12.

In some embodiments, the first mesh block MB1 and the fifth mesh block MB5 are directly adjacent mesh blocks in a same row, e.g., directly adjacent mesh blocks in a first respective one of the plurality of first mesh electrodes TE1. Optionally, the third mesh blocks MB3 and the fourth mesh blocks MB4 are directly adjacent mesh blocks in a same column, e.g., directly adjacent mesh blocks in a first respective one of the plurality of second mesh electrodes TE2. Optionally, the sixth mesh block MB6 is a mesh block in a second respective one of the plurality of first mesh electrodes TE1. Optionally, the second mesh block MB2 is a mesh block in a second respective one of the plurality of second mesh electrodes TE2.

In some embodiments, the first mesh block MB1, the second mesh block MB2, the third mesh blocks MB3, the fourth mesh blocks MB4, the fifth mesh block MB5, the sixth mesh block MB6, and the window fill pattern DEw are in a same layer. Optionally, all mesh blocks of the plurality of first mesh electrodes TE1, the plurality of second mesh electrodes TE2, and the plurality of mesh fill patterns DE are in a same layer. Optionally, the first capacitance-compensating conductive plate CCP1, the second capacitance-compensating conductive plate CCP2, the third capacitance-compensating conductive plate CCP3, the fourth capacitance-compensating conductive plate CCP4 are in a same layer. Optionally, the first dummy plate DP1 and the second dummy plate DP2 are in a same layer. In one example, the first mesh block MB1, the second mesh block MB2, the third mesh blocks MB3, the fourth mesh blocks MB4, the fifth mesh block MB5, the sixth mesh block MB6, the window fill pattern DEw, the first capacitance-compensating conductive plate CCP1, the second capacitance-compensating conductive plate CCP2, the third capacitance-compensating conductive plate CCP3, the fourth capacitance-compensating conductive plate CCP4, the first dummy plate DP1, and the second dummy plate DP2 are in a same layer.

Referring to FIG. 4, a crossing-over area where the conductive bridge CB crosses over a capacitance-compensating conductive plate (e.g., the first capacitance-compensating conductive plate CCP1 or the third capacitance-compensating conductive plate CCP3) is minimized to achieve an enhanced touch performance. As shown in FIG. 4, the conductive bridge CB in one example includes a first cross-over tooth CT1 that crosses over the first capacitance-compensating conductive plate CCP1 to connect to at least one mesh line of the first mesh block MB1. In a region where the first cross-over tooth CT1 crosses over the first capacitance-compensating conductive plate CCP1, a portion of the first capacitance-compensating conductive plate CCP1 is carved out to minimize the crossing-over area, forming a concave portion in the first capacitance-compensating conductive plate CCP1. Optionally, the concave portion has a minimal line width in a range of 10 μm to 40 μm, e.g., 10 μm to 15 μm, 15 μm to 20 μm, 20 μm to 25 μm, 25 μm to 30 μm, 30 μm to 35 μm, or 35 μm to 40 μm. Optionally, the concave portion has a minimal line width of 21.4 μm. Similarly, the conductive bridge CB in another example includes a second cross-over tooth CT2 that crosses over the third capacitance-compensating conductive plate CCP3 to connect to at least one mesh line of the fifth mesh block MB5. In a region where the second cross-over tooth CT2 crosses over the third capacitance-compensating conductive plate CCP3, a portion of the third capacitance-compensating conductive plate CCP3 is carved out to minimize the crossing-over area, forming a concave portion in the third capacitance-compensating conductive plate CCP3. Optionally, the concave portion has a minimal line width in a range of 10 μm to 40 μm, e.g., 10 μm to 15 μm, 15 μm to 20 μm, 20 μm to 25 μm, 25 μm to 30 μm, 30 μm to 35 μm, or 35 μm to 40 μm. Optionally, the concave portion has a minimal line width of 21.4 μm. Optionally, an orthographic projection of the conductive bridge CB and an orthographic projection of the first dummy plate DP1 on a touch insulating layer partially overlap with each other. Optionally, the conductive bridge CB further includes a third tooth CT3 that is electrically connected to at least one mesh line of the first mesh block MB1, but does not cross over the first capacitance-compensating conductive plate CCP1. Optionally, the third tooth CT3 and the first cross-over tooth CT1 extend along directions substantially parallel to each other.

Referring to FIG. 2A and FIG. 2B, in some embodiments, the second mesh block MB2 is on a first side S1 of the window region WR, the third mesh block MB3 is on a second side S2 of the window region WR, the first mesh block MB1 is on a third side S3 of the window region WR, and the sixth mesh block MB6 is on a fourth side S4 of the window region WR. Optionally, the first side S1 and the second side S2 are substantially along a row direction Drow of an array of the mesh blocks of the touch control structure, and the third side S3 and the fourth side S4 are substantially along a column direction Dcol of the array of the mesh blocks of the touch control structure. Optionally, the row direction Drow of the array of the mesh blocks of the touch control structure is substantially the same as an extension direction of a respective one of the plurality of first mesh electrodes TE1, and the column direction Dcol of the array of the mesh blocks of the touch control structure is substantially the same as an extension direction of a respective one of the plurality of second mesh electrodes TE2. Optionally, the fourth mesh block MB4 is on the third side S3 of the window region WR. Optionally, the fifth mesh block MB5 is on the second side S3 of the window region WR.

In some embodiments, at least one of the second portion P2, the fourth portion P4, and the fifth portion P5 is on the first side S1 of the window region WR; at least one of the sixth portion P6 and the tenth portion P10 is on the second side S2 of the window region WR; at least one of the first portion P1, the seventh portion P7, the ninth portion P9 is on the third side S3 of the window region WR; and at least one of the twelfth portion P12, the thirteenth portion P13, and the fourteenth portion P14 is on the fourth side S4 of the window region WR.

The inventors of the present disclosure discover that, due to the presence of the window region WR, one or more of plurality of window-adjacent mesh blocks are partially truncated, resulting in a reduced capacitance. The touch performance can be adversely affected by the reduced capacitance of the truncated one or more of plurality of window-adjacent mesh blocks. The inventors of the present disclosure discover that, surprisingly and unexpectedly, the reduced capacitance of the truncated one or more of plurality of window-adjacent mesh blocks can be compensated by the plurality of capacitance-compensating plates by having an intricate touch control structure surround the window region WR. Moreover, the plurality of capacitance-compensating plates surrounding portions of the window region shield light from entering display panel from the window region WR.

In some embodiments, an occupied area of the respective one of the plurality of capacitance-compensating plates is correlated to a reduction in an occupied area of the respective one of the plurality of window-adjacent mesh blocks relative to a reference mesh block. In some embodiments, the reference mesh block is an internal mesh block electrically connected to the respective one of the plurality of window-adjacent mesh blocks, the internal mesh block spaced apart from the window region by the respective one of the plurality of window-adjacent mesh blocks. As used herein, the term "internal mesh block" refers to a mesh block that is not directly adjacent to any edge of the touch control structure, and is not directly adjacent to the window region. As used herein, the term "occupied area" refers to an area occupied by the electrode blocks or the fill patterns. In case the electrode blocks or fill patterns are mesh electrode blocks or mesh patterns, the "occupied area" refers to an area encircled by boundaries (formed by line breaks in the mesh lines) respectively of the electrode blocks and the fill patterns, excluding areas occupied by any internal fill patterns in an electrode block.

Figure 6A:
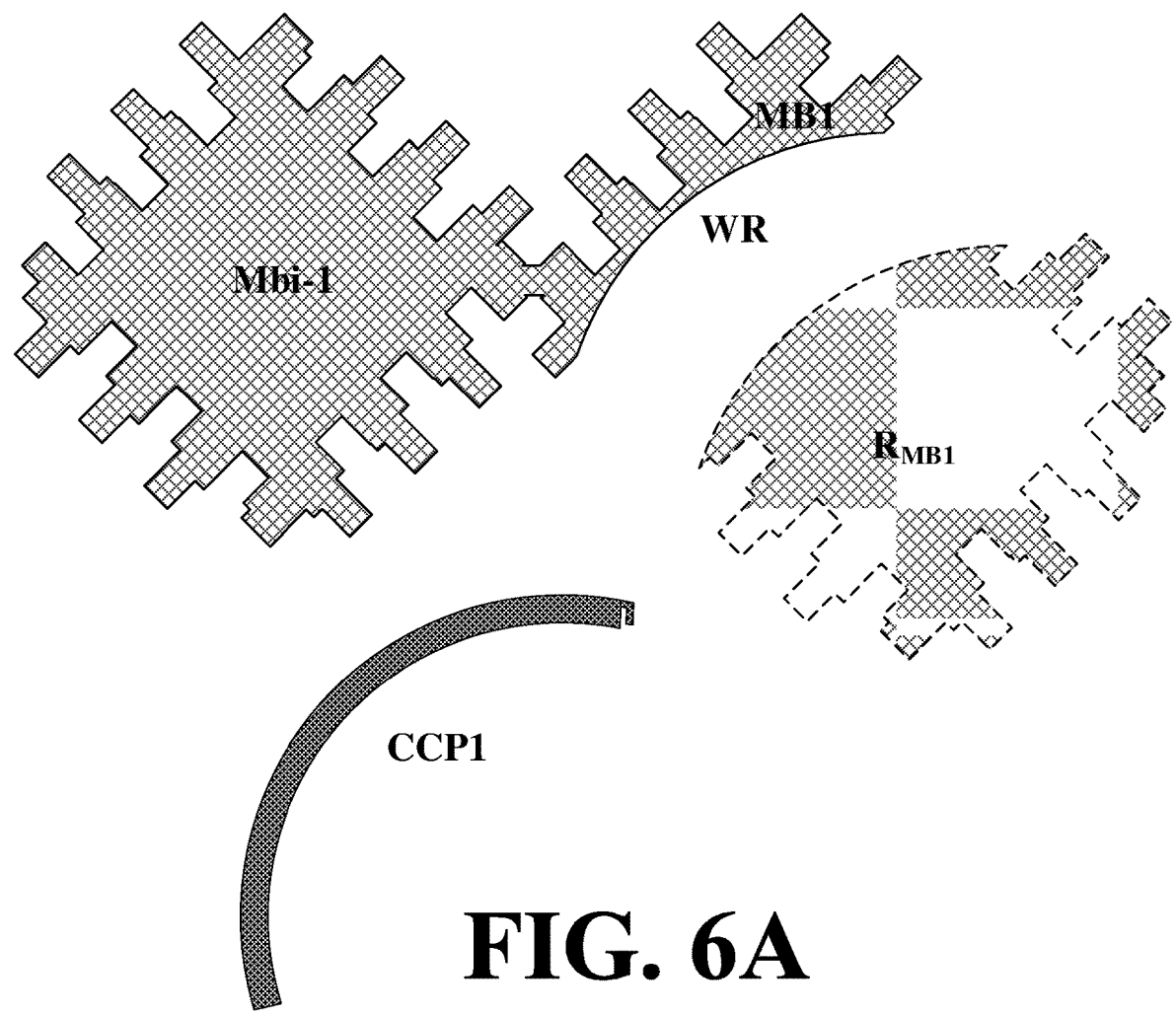
FIG. 6A illustrates a correlation between an occupied area of a first capacitance-compensating plate and a reduction in an occupied area of a first mesh block in some embodiments according to the present disclosure.
Figure 6B:
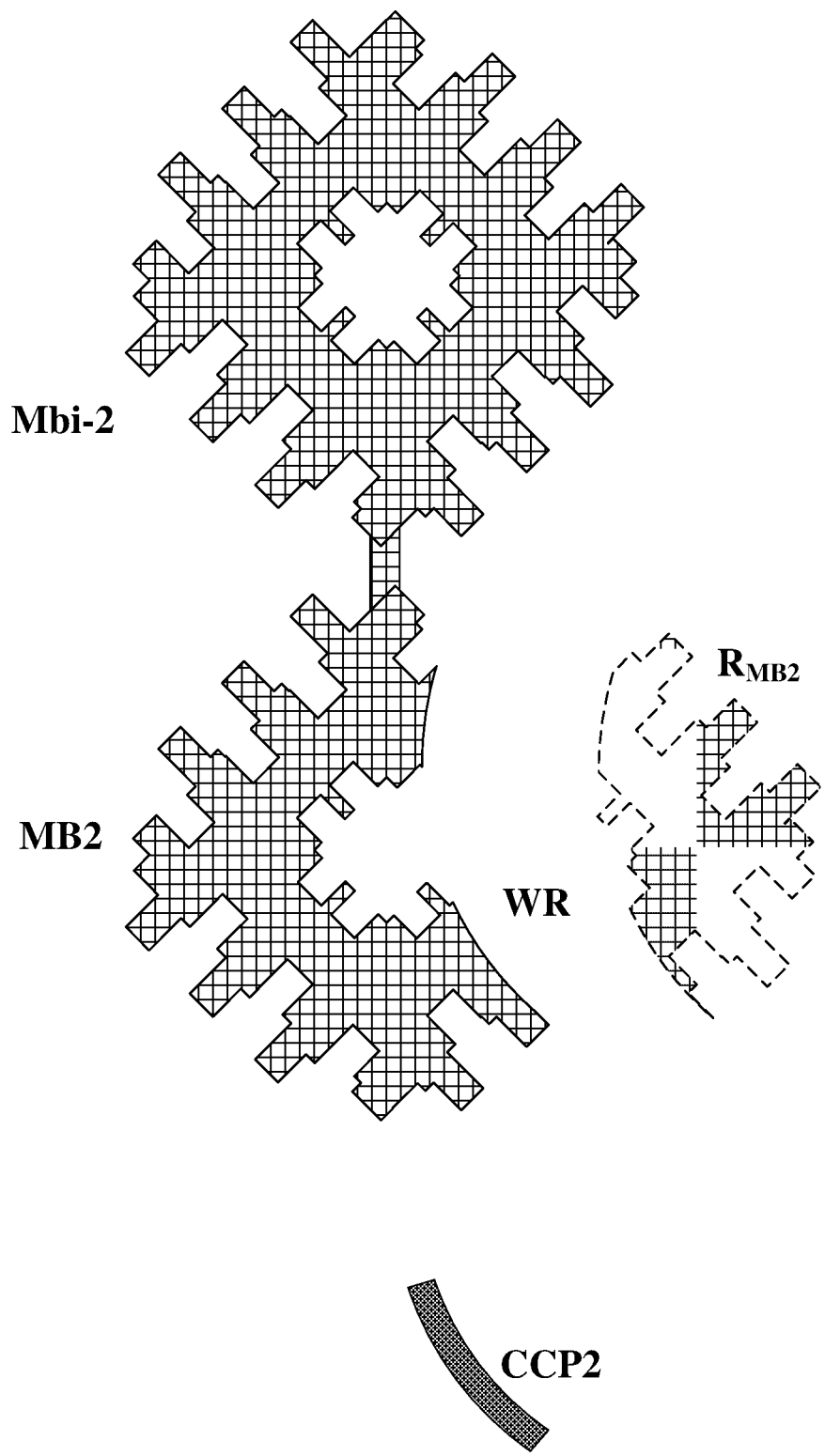
FIG. 6B illustrates a correlation between an occupied area of a second capacitance-compensating plate and a reduction in an occupied area of a second mesh block in some embodiments according to the present disclosure.
Figure 6C:
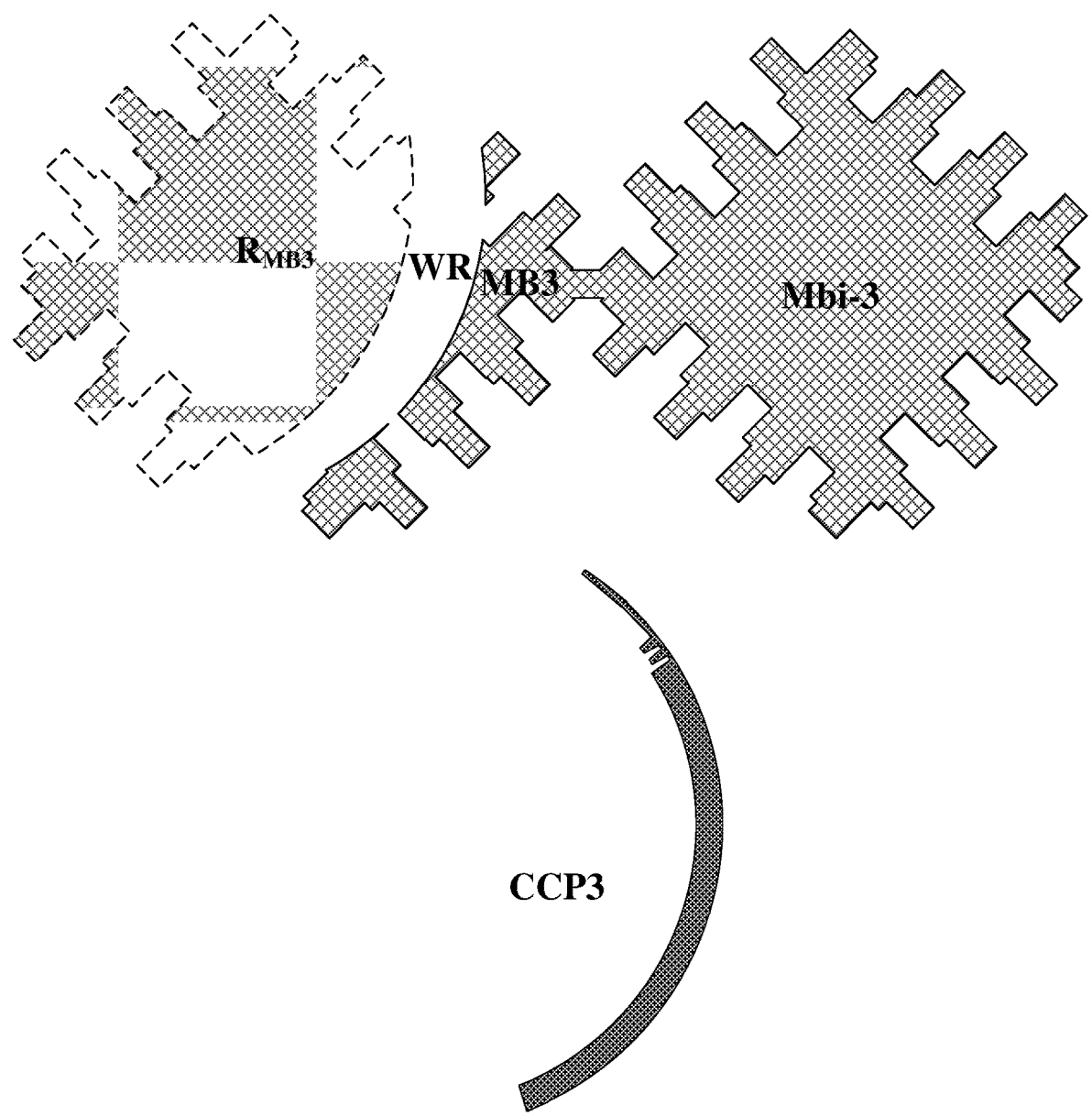
FIG. 6C illustrates a correlation between an occupied area of a third capacitance-compensating plate and a reduction in an occupied area of a third mesh block in some embodiments according to the present disclosure.
Figure 6D:
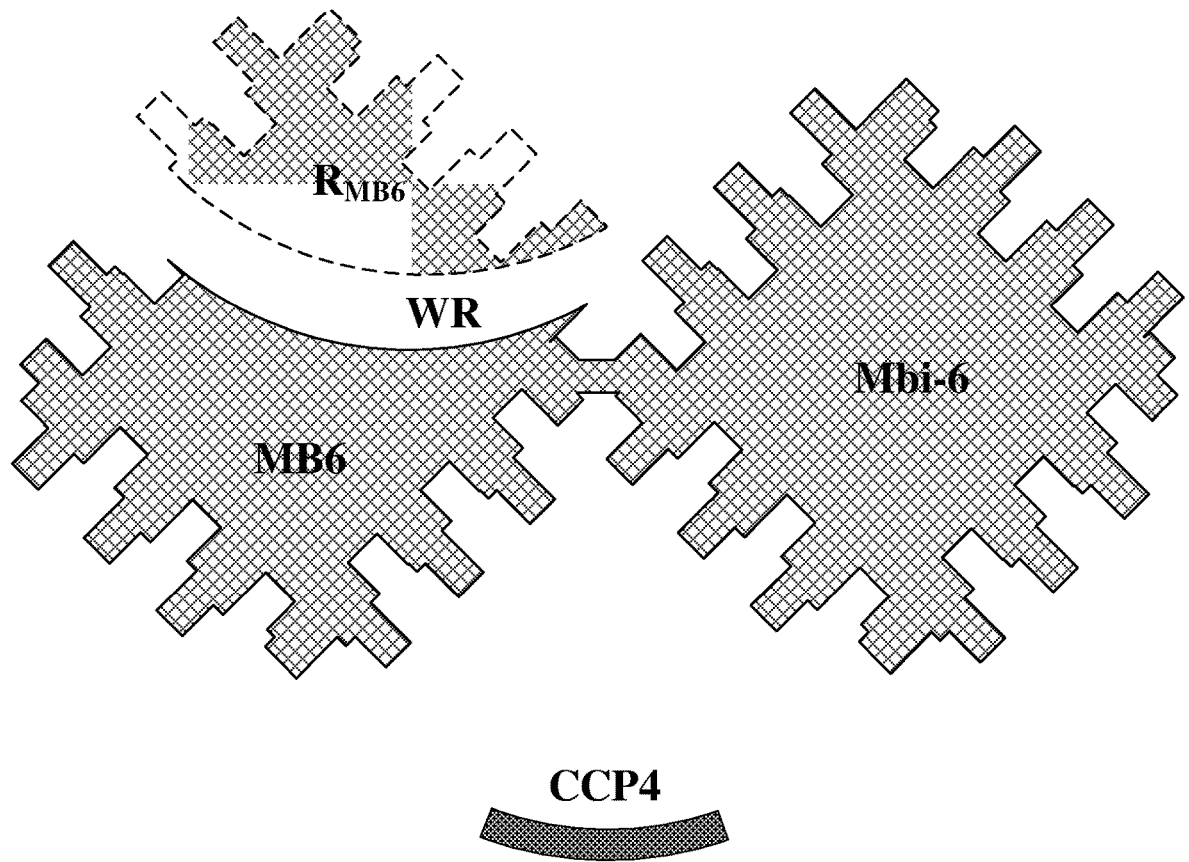
FIG. 6D illustrates a correlation between an occupied area of a fourth capacitance-compensating plate and a reduction in an occupied area of a sixth mesh block in some embodiments according to the present disclosure.

FIG. 6A illustrates a correlation between an occupied area of a first capacitance-compensating plate and a reduction in an occupied area of a first mesh block in some embodiments according to the present disclosure. Referring to FIG. 6A, a first internal mesh block Mbi-1 is electrically connected (directly or indirectly, and in a same row) to the first mesh block MB1, and is spaced apart from the window region WR by the first mesh block MB1. A first reduction in occupied area $R_{MB1}$ is shown (area encircled by dotted lines), and the first capacitance-compensating conductive plate CCP1 is also shown in FIG. 6A. FIG. 6B illustrates a correlation between an occupied area of a second capacitance-compensating plate and a reduction in an occupied area of a second mesh block in some embodiments according to the present disclosure. Referring to FIG. 6B, a second internal mesh block Mbi-2 is electrically connected (directly or indirectly, and in a same column) to the second mesh block MB2, and is spaced apart from the window region WR by the second mesh block MB2. A second reduction in occupied area $R_{MB2}$ is shown (area encircled by dotted lines), and the second capacitance-compensating conductive plate CCP2 is also shown in FIG. 6B. FIG. 6C illustrates a correlation between an occupied area of a third capacitance-compensating plate and a reduction in an occupied area of a third mesh block in some embodiments according to the present disclosure. Referring to FIG. 6C, a third internal mesh block Mbi-3 is electrically connected (directly or indirectly, and in a same row) to the third mesh block MB3, and is spaced apart from the window region WR by the third mesh block MB3. A third reduction in occupied area $R_{MB3}$ is shown (area encircled by dotted lines), and the third capacitance-compensating conductive plate CCP3 is also shown in FIG. 6C. FIG. 6D illustrates a correlation between an occupied area of a fourth capacitance-compensating plate and a reduction in an occupied area of a sixth mesh block in some embodiments according to the present disclosure. Referring to FIG. 6D, a sixth internal mesh block Mbi-6 is electrically connected (directly or indirectly, and in a same row) to the sixth mesh block MB6, and is spaced apart from the window region WR by the sixth mesh block MB6. A sixth reduction in occupied area $R_{MB6}$ is shown (area encircled by dotted lines), and the fourth capacitance-compensating conductive plate CCP4 is also shown in FIG. 6D.

As illustrated in FIG. 6A to FIG. 6D, occupied areas of the plurality of capacitance-compensating plates (e.g., the first capacitance-compensating plate CCP1, the second capacitance-compensating plate CCP2, the third capacitance-compensating plate CCP3, and the fourth capacitance-compensating plate CCP4) are correlated to reductions in occupied areas (e.g., the first reduction in occupied area $R_{MB1}$, the second reduction in occupied area $R_{MB2}$, the third reduction in occupied area $R_{MB3}$, and the sixth reduction in occupied area $R_{MB6}$) of the plurality of window-adjacent mesh blocks (e.g., the first mesh block MB1, the second mesh block MB2, the third mesh block MB3, and the sixth mesh block MB6) respectively relative to reference mesh blocks. In one example, the reference mesh blocks internal mesh blocks (e.g., the first internal mesh block Mbi-1, the second internal mesh block Mbi-2, the third internal mesh block Mbi-3, and the sixth internal mesh block Mbi-6) respectively electrically connected to the plurality of window-adjacent mesh blocks. A respective internal mesh block is spaced apart from the window region by a respective window-adjacent mesh block.

In some embodiments, a ratio of occupied areas of respective two of the plurality of capacitance-compensating conductive plates is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of reductions in occupied areas of respective two of the plurality of window-adjacent mesh blocks respectively connected to the respective two of the plurality of capacitance-compensating conductive plates. Optionally, the ratio of occupied areas of respective two of the plurality of capacitance-compensating conductive plates is within 10% of the ratio of reductions in occupied areas of respective two of the plurality of window-adjacent mesh blocks respectively connected to the respective two of the plurality of capacitance-compensating conductive plates. The reductions in occupied areas are respectively relative to respective two internal mesh blocks respectively electrically connected to the respective two of the plurality of window-adjacent mesh blocks. The two internal mesh blocks are respectively spaced apart from the window region respectively by the respective two of the plurality of window-adjacent mesh blocks. Referring to FIG. 6A to FIG. 6D, in one example, a ratio of occupied areas of the first capacitance-compensating plate CCP1 and the second capacitance-compensating plate CCP2 is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of the first reduction in occupied area $R_{MB1}$ and the second reduction in occupied area $R_{MB2}$. In another example, a ratio of occupied areas of the first capacitance-compensating plate CCP1 and the third capacitance-compensating plate CCP3 is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of the first reduction in occupied area $R_{MB1}$ and the third reduction in occupied area $R_{MB3}$. In another example, a ratio of occupied areas of the first capacitance-compensating plate CCP1 and the fourth capacitance-compensating plate CCP4 is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of the first reduction in occupied area $R_{MB1}$ and the sixth reduction in occupied area $R_{MB6}$. In another example, a ratio of occupied areas of the second capacitance-compensating plate CCP2 and the third capacitance-compensating plate CCP3 is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of the second reduction in occupied area $R_{MB2}$ and the third reduction in occupied area $R_{MB3}$. In another example, a ratio of occupied areas of the second capacitance-compensating plate CCP2 and the fourth capacitance-compensating plate CCP4 is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of the second reduction in occupied area $R_{MB2}$ and the sixth reduction in occupied area $R_{MB6}$. In another example, a ratio of occupied areas of the third capacitance-compensating plate CCP3 and the fourth capacitance-compensating plate CCP4 is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of the third reduction in occupied area $R_{MB3}$ and the sixth reduction in occupied area $R_{MB6}$.

In some embodiments, the plurality of window-adjacent mesh blocks include one or more first type window-adjacent mesh blocks (e.g., the first mesh block MB1, the third mesh block MB3, and the sixth mesh block MB6) that are parts of the plurality of first mesh electrodes TE1, and one or more second type window-adjacent mesh blocks (e.g., the second mesh block MB2) that are parts of the plurality of second mesh electrodes TE2. The plurality of capacitance-compensating plates include one or more first type capacitance-compensating plates (e.g., the first capacitance-compensating plate CCP1, the third capacitance-compensating plate CCP3, and the fourth capacitance-compensating plate CCP4) respectively connected to the one or more first type window-adjacent mesh blocks, and one or more second type capacitance-compensating plates (e.g., the second capacitance-compensating plate CCP2) respectively connected to the one or more second type window-adjacent mesh blocks.

In some embodiments, an occupied area of the respective one of the plurality of capacitance-compensating plates is correlated to a reduction in an occupied area of the respective one of the plurality of window-adjacent mesh blocks. Optionally, the reduction in the occupied area with respect to a respective one of the one or more first type window-adjacent mesh blocks is a difference between an occupied area of the respective one of the one or more first type window-adjacent mesh blocks and an average occupied area of mesh blocks of the plurality of first mesh electrodes that are spaced apart from the window region and edges of the touch control structure. Optionally, the reduction in the occupied area with respect to a respective one of the one or more second type window-adjacent mesh blocks is a difference between an occupied area of the respective one of the one or more second type window-adjacent mesh blocks and an average occupied area of mesh blocks of the plurality of second mesh electrodes that are spaced apart from the window region and edges of the touch control structure.

In some embodiments, a ratio of occupied areas of respective two of the plurality of capacitance-compensating conductive plates is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of reductions in occupied areas of respective two of the plurality of window-adjacent mesh blocks respectively connected to the respective two of the plurality of capacitance-compensating conductive plates. Optionally, a reduction in the occupied area with respect to a respective one of the one or more first type window-adjacent mesh blocks is a difference between an occupied area of the respective one of the one or more first type window-adjacent mesh blocks and an average occupied area of mesh blocks of the plurality of first mesh electrodes that are spaced apart from the window region and edges of the touch control structure. Optionally, a reduction in the occupied area with respect to a respective one of the one or more second type window-adjacent mesh blocks is a difference between an occupied area of the respective one of the one or more second type window-adjacent mesh blocks and an average occupied area of mesh blocks of the plurality of second mesh electrodes that are spaced apart from the window region and edges of the touch control structure.

Referring to FIG. 6A, in some embodiments, an electrode area of the first capacitance-compensating conductive plate CCP1 is substantially same as an electrode area of the first reduction in occupied area $R_{MB1}$. Optionally, a sum of electrode areas of the first capacitance-compensating conductive plate CCP1 and the first mesh block MB1 is substantially same as an electrode area of the first internal mesh block Mbi-1. As used herein, the term "substantially same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value. As used herein, the term "electrode area" refers to an actual surface area of the electrode material of the electrode blocks or the fill patterns. In case the electrode blocks or fill patterns are mesh electrode blocks or mesh patterns, the "electrode area" refers to accumulated actual surface areas of mesh lines in the electrode blocks and the fill patterns.

Referring to FIG. 6B, in some embodiments, an electrode area of the second capacitance-compensating conductive plate CCP2 is substantially same as an electrode area of the second reduction in occupied area $R_{MB2}$. Optionally, a sum of electrode areas of the second capacitance-compensating conductive plate CCP2 and the second mesh block MB2 is substantially same as an electrode area of the second internal mesh block Mbi-2.

Referring to FIG. 6C, in some embodiments, an electrode area of the third capacitance-compensating conductive plate CCP3 is substantially same as an electrode area of the third reduction in occupied area $R_{MB3}$. Optionally, a sum of electrode areas of the third capacitance-compensating conductive plate CCP3 and the third mesh block MB3 is substantially same as an electrode area of the third internal mesh block Mbi-3.

Referring to FIG. 6D, in some embodiments, an electrode area of the fourth capacitance-compensating conductive plate CCP4 is substantially same as an electrode area of the sixth reduction in occupied area $R_{MB6}$. Optionally, a sum of electrode areas of the fourth capacitance-compensating conductive plate CCP4 and the sixth mesh block MB6 is substantially same as an electrode area of the sixth internal mesh block Mbi-6.

In one example, the first capacitance-compensating conductive plate CCP1 has an electrode area or an occupied area in a range of $1.0 \times 10^6$ $\mu m^2$ to $1.2 \times 10^2$ $\mu m^2$ (e.g., 1109090 $\mu m^2$), the second capacitance-compensating conductive plate CCP2 has an electrode area or an occupied area in a range of $3.0 \times 10^5$ $\mu m^2$ to $4.0 \times 10^5$ (e.g., 354669 $\mu m^2$), the third capacitance-compensating conductive plate CCP3 has an electrode area or an occupied area in a range of $9.0 \times 10^5$ $\mu m^2$ to $1.1 \times 10^6$ $\mu m^2$ (e.g., 992915 $\mu m^2$), and the fourth capacitance-compensating conductive plate CCP4 has an electrode area or an occupied area in a range of $3 \times 10^5$ $\mu m^2$ to $5.0 \times 10^5$ $\mu m^2$ (e.g., 420081 $\mu m^2$).

In one example, the first internal mesh block Mbi-1 has an occupied area in a range of $8.0 \times 10^6$ $\mu m^2$ to $1.0 \times 10^7$ $\mu m^2$ (e.g., 9041893 $\mu m^2$), the second internal mesh block Mbi-2 has an occupied area in a range of $7.0 \times 10^6$ $\mu m^2$ to $9.0 \times 10^6$ $\mu m^2$ (e.g., 7756629 $\mu m^2$), the third internal mesh block Mbi-3 has an occupied area in a range of $8.0 \times 10^6$ $\mu m^2$ to $1.0 \times 10^7$ $\mu m^2$ (e.g., 9041893 $\mu m^2$), the sixth internal mesh block Mbi-6 has an occupied area in a range of $8.0 \times 10^6$ $\mu m^2$ to $1.0 \times 10^7$ $\mu m^2$ (e.g., 9041893 $\mu m^2$).

In one example, the first mesh block MB1 has an occupied area in a range of $1.8 \times 10^6$ $\mu m^2$ to $2.0 \times 10^6$ $\mu m^2$ (e.g., 1918554 $\mu m^2$), the second mesh block MB2 has an occupied area in a range of $4.0 \times 10^6$ $\mu m^2$ to $5.0 \times 10^6$ $\mu m^2$ (e.g., 4337580 $\mu m$), the third mesh block MB3 has an occupied area in a range of $11.5 \times 10^6$ $\mu m^2$ to $1.7 \times 10^6$ $\mu m^2$ (e.g., 1633200 $\mu m^2$, the sixth mesh block MB6 has an occupied area in a range of $5.0 \times 10^6$ $\mu m^2$ to $7.0 \times 10^6$ $\mu m^2$ (e.g., 6107887 $\mu m^2$).

In one example, the first reduction in occupied area $R_{MB1}$ is in a range of $6.0 \times 10^6$ $\mu m^2$ to $8.0 \times 10^6$ $\mu m^2$ (e.g., 7123340 $\mu m^2$), the second reduction in occupied area $R_{MB2}$ is in a range of $2.5 \times 10^6$ $\mu m^2$ to $4.5 \times 10^6$ $\mu m^2$ (e.g., 3419049 $\mu m^2$), the third reduction in occupied area $R_{MB3}$ is in a range of $6.5 \times 10^6$ $\mu m^2$ to $8.5 \times 10^6$ $\mu m^2$ (e.g., 7408693 $\mu m^2$), the sixth reduction in occupied area $R_{MB6}$ is in a range of $2.0 \times 10^6$ $\mu m^2$ to $4.0 \times 10^6$ $\mu m^2$ (e.g., 2934006 $\mu m^2$).

In one example, a ratio of A:B is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of C:D, wherein A and B are electrode areas or occupied areas of any two different capacitance-compensating conductive plates selected from a group consisting of the first capacitance-compensating conductive plate CCP1, the second capacitance-compensating conductive plate CCP2, the third capacitance-compensating conductive plate CCP3, and the fourth capacitance-compensating conductive plate CCP4; C and D are any two different reductions in occupied area selected from a group consisting of the first reduction in occupied area $R_{MB1}$, the second reduction in occupied area $R_{MB2}$, the third reduction in occupied area $R_{MB3}$, the sixth reduction in occupied area $R_{MB6}$.

In one example, the capacitance-compensating conductive plate (e.g., the first capacitance-compensating conductive plate CCP1, the second capacitance-compensating conductive plate CCP2, the third capacitance-compensating conductive plate CCP3, or the fourth capacitance-compensating conductive plate CCP4) has a plate width along a direction perpendicular to an interface between the capacitance-compensating conductive plate and the mesh block (e.g., the first mesh block MB1, the second mesh block MB2, the third mesh block MB3, or the sixth mesh block MB4) electrically connected to the capacitance-compensating conductive plate. Optionally, the plate width is in a range of 50 μm to 750 μm, e.g., 50 μm to 75 μm, 75 μm to 100 μm, 100 μm to 125 μm, 125 μm to 150 μm, 150 μm to 175 μm, 175 μm to 200 μm, 200 μm to 225 μm, 225 μm to 250 μm, 250 μm to 275 μm, 275 μm to 300 μm, 300 μm to 325 μm, 325 μm to 350 μm, 350 μm to 375 μm, 375 μm to 400 μm, 400 μm to 425 μm, 425 μm to 450 μm, 450 μm to 475 μm, 475 μm to 500 μm, 500 μm to 550 μm, 550 μm to 600 μm, 600 μm to 650 μm, 650 μm to 700 μm, or 700 μm to 750 μm. Optionally, the plate width is 221 μm.

In another example, the mesh line of the mesh block has a line width. Optionally, the line width is in a range of 1 μm to 5 μm, e.g., 1 μm to 2 μm, 2 μm to 3 μm, 3 μm to 4 μm, or 4 μm to 5 μm. Optionally, the line width is 3 μm. Optionally, a ratio between the plate width and the line width is greater than 10:1, e.g., greater than 20:1, greater than 30:1, greater than 40:1, greater than 50:1, greater than 60:1, greater than 70:1, greater than 80:1, greater than 90:1, or greater than 100:1.

Figure 7A:
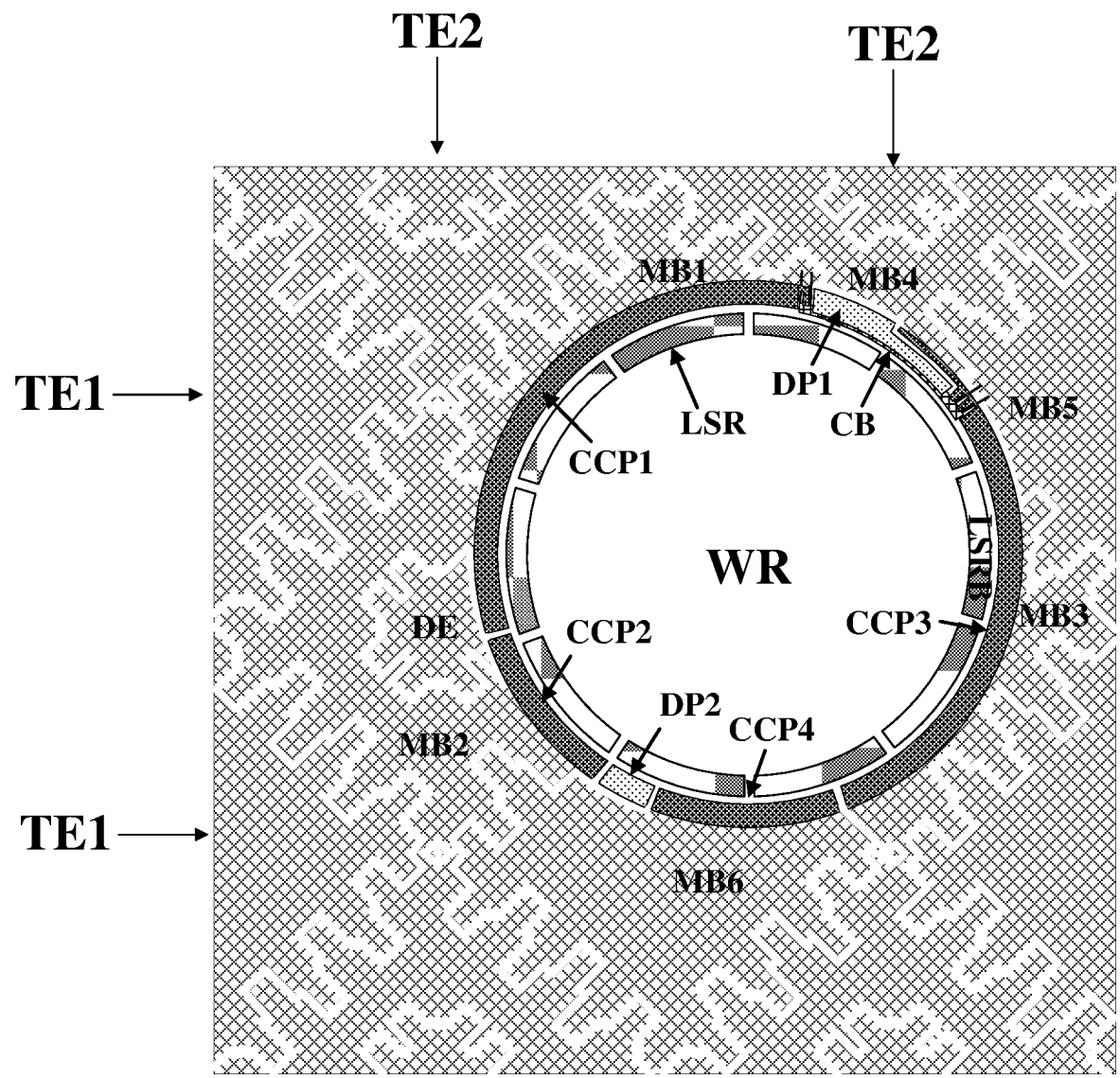
FIG. 7A is a partial view of the structure of a touch control structure around a window region in some embodiments according to the present disclosure.

FIG. 7A is a partial view of the structure of a touch control structure around a window region in some embodiments according to the present disclosure. Referring to FIG. 7A, the touch control structure in some embodiments further includes a light shielding ring LSR between the window region WR and the plurality of capacitance-compensating plates. The light shielding ring LSR substantially surrounds the periphery of the window region WR. The light shielding ring LSR functions to shield light from entering display panel from the window region WR. Various formats may be implemented for making the light shielding ring LSR. In one example, the light shielding ring LSR has a unitary structure (e.g., an intact ring structure) substantially surrounding the periphery of the window region WR. In another example, as shown in FIG. 7A, the light shielding ring LSR includes a plurality of light shielding ring blocks LSRB spaced apart from each other, and surrounding multiple portions of the periphery of the window region WR.

In some embodiments, the first mesh block MB1, the second mesh block MB2, the third mesh blocks MB3, the fourth mesh blocks MB4, the fifth mesh block MB5, the sixth mesh block MB6, and the window fill pattern DEw are in a same layer. Optionally, all mesh blocks of the plurality of first mesh electrodes TE1, the plurality of second mesh electrodes TE2, and the plurality of mesh fill patterns DE are in a same layer. Optionally, the first capacitance-compensating conductive plate CCP1, the second capacitance-compensating conductive plate CCP2, the third capacitance-compensating conductive plate CCP3, the fourth capacitance-compensating conductive plate CCP4 are in a same layer. Optionally, the first dummy plate DP1 and the second dummy plate DP2 are in a same layer. In one example, the first mesh block MB1, the second mesh block MB2, the third mesh blocks MB3, the fourth mesh blocks MB4, the fifth mesh block MB5, the sixth mesh block MB6, the window fill pattern DEw, the first capacitance-compensating conductive plate CCP1, the second capacitance-compensating conductive plate CCP2, the third capacitance-compensating conductive plate CCP3, the fourth capacitance-compensating conductive plate CCP4, the first dummy plate DP1, and the second dummy plate DP2 are in a same layer. Optionally, the light shielding ring LSR is in a different layer from the first mesh block MB1, the second mesh block MB2, the third mesh blocks MB3, the fourth mesh blocks MB4, the fifth mesh block MB5, the sixth mesh block MB6, the window fill pattern DEw, the first capacitance-compensating conductive plate CCP1, the second capacitance-compensating conductive plate CCP2, the third capacitance-compensating conductive plate CCP3, the fourth capacitance-compensating conductive plate CCP4 the first dummy plate DP1, and the second dummy plate DP2.

Figure 7B:
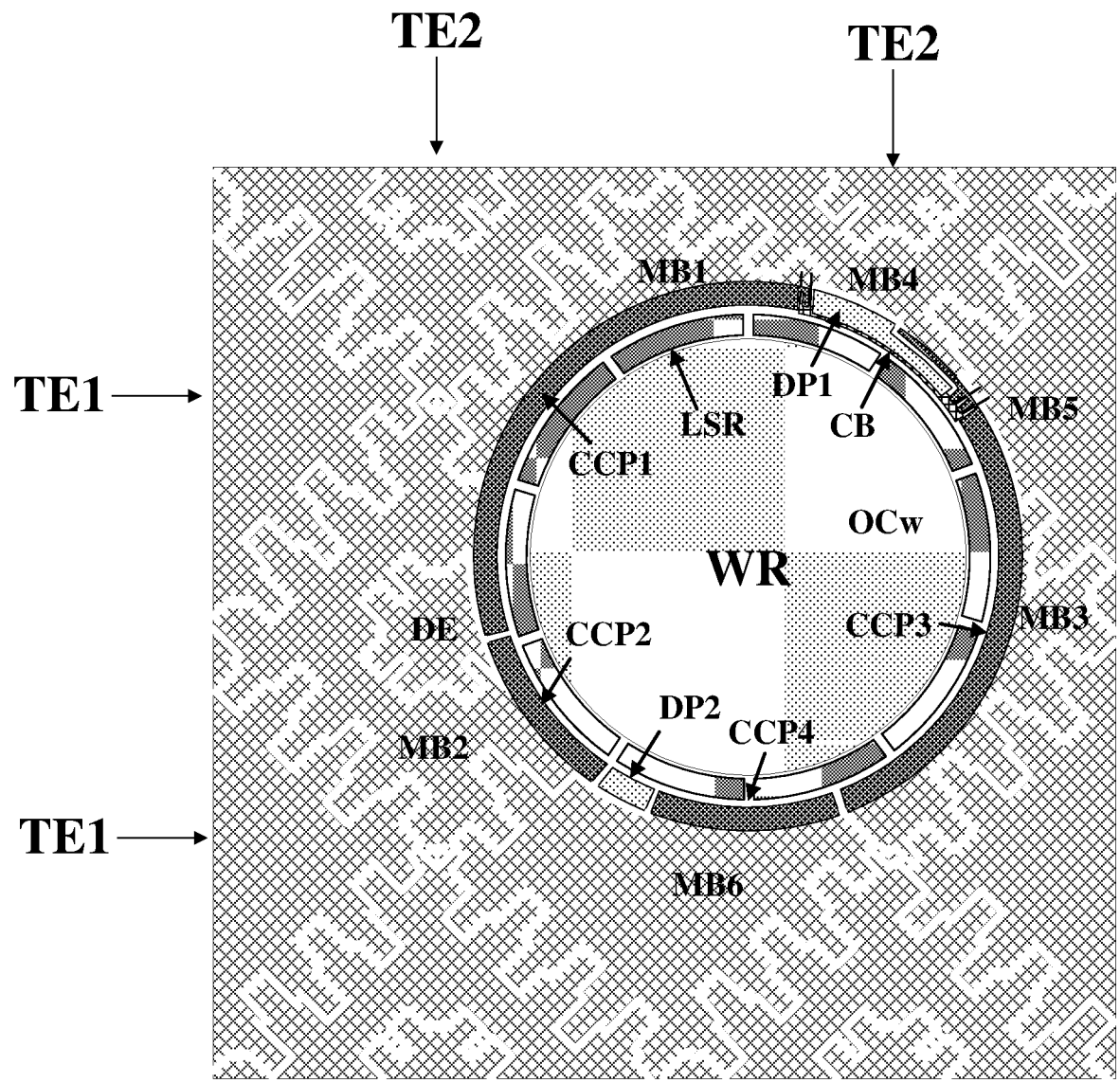
FIG. 7B is a partial view of the structure of a touch control structure around a window region in some embodiments according to the present disclosure.

FIG. 7B is a partial view of the structure of a touch control structure around a window region in some embodiments according to the present disclosure. Referring to FIG. 7B, the touch control structure in some embodiments further includes a window overcoat layer OCw in the window region WR.

The capacitance-compensating conductive plate (e.g., each of the first capacitance-compensating conductive plate CCP1, the second capacitance-compensating conductive plate CCP2, the third capacitance-compensating conductive plate CCP3, and the fourth capacitance-compensating conductive plate CCP4) may be implemented with various appropriate forms of structures. In some embodiments, and referring to FIG. 5A, FIG. 5B, FIG. 5C, the capacitance-compensating conductive plate has a single layer structure, which is optionally in a same layer as mesh lines of mesh blocks of the plurality of first mesh electrodes TE1 and the plurality of second mesh electrodes TE2.

Figure 8A:
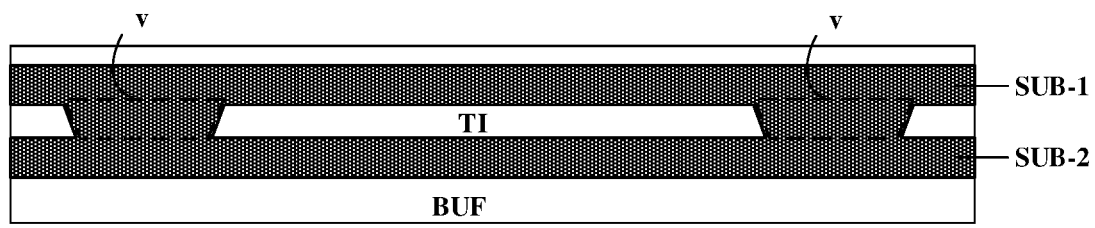
FIG. 8A is a schematic diagram illustrating the structure of a capacitance-compensating conductive plate in some embodiments according to the present disclosure.
Figure 8B:
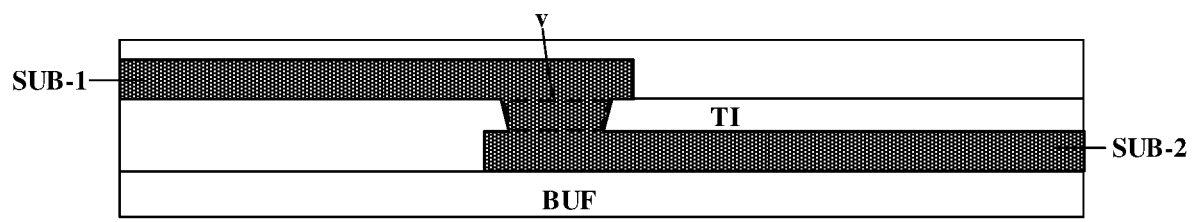
FIG. 8B is a schematic diagram illustrating the structure of a capacitance-compensating conductive plate in some embodiments according to the present disclosure.

In some embodiment, the capacitance-compensating conductive plate has a double sub-layer structure, including a first sub-layer in a same layer as the mesh lines of mesh blocks of the plurality of first mesh electrodes TE1 and the plurality of second mesh electrodes TE2, and a second sub-layer in a same layer as the conductive bridge CB. FIG. 8A is a schematic diagram illustrating the structure of a capacitance-compensating conductive plate in some embodiments according to the present disclosure. FIG. 8B is a schematic diagram illustrating the structure of a capacitance-compensating conductive plate in some embodiments according to the present disclosure. Referring to FIG. 8A and FIG. 8B, the double sub-layer structure includes a first sub-layer SUB-1 and a second sub-layer SUB-2. The first sub-layer SUB-1 is connected to the second sub-layer SUB-2 through a via v extending through the touch insulating layer TI. In FIG. 8A, orthographic projections of the first sub-layer SUB-1 and the second sub-layer SUB-2 on the touch insulating layer TI at least partially overlaps with each other throughout an entire length of the capacitance-compensating conductive plate. In FIG. 8B, the first sub-layer SUB-1 and the second sub-layer SUB-2 alternate with each other. Orthographic projections of the first sub-layer SUB-1 and the second sub-layer SUB-2 on the touch insulating layer TI are substantially non-overlapping with each other except for around a position where the first sub-layer SUB-1 connects with the second sub-layer SUB-2 through the via v.

In some embodiments, different capacitance-compensating conductive plates, or portions of different capacitance-compensating conductive plates, are in difference layers. Optionally, different capacitance-compensating conductive plates, or portions of different capacitance-compensating conductive plates, are respectively in a first layer and a second layer, wherein the first layer is in a same layer as the mesh lines of mesh blocks of the plurality of first mesh electrodes TE1 and the plurality of second mesh electrodes TE2, and the second layer is in a same layer as the conductive bridge CB. In one example, the first capacitance-compensating conductive plate CCP1 or a portion thereof is in the first layer, the second capacitance-compensating conductive plate CCP2 or a portion thereof is in the second layer. Optionally, orthographic projections of the first capacitance-compensating conductive plate CCP1, and the second capacitance-compensating conductive plate CCP2 on the base substrate BS are non-overlapping with each other. Optionally, an orthographic projection of the first capacitance-compensating conductive plate CCP1 partially overlaps with the second capacitance-compensating conductive plate CCP2 on the base substrate BS.

In another aspect, the present disclosure provides a display panel including the touch control structure described herein or fabricated by a method described herein, and a hole in the window region. The display panel is configured to display an image in at least a portion of the touch control region. In some embodiments, display elements of the display panel are absent in the window region.

Figure 9A:
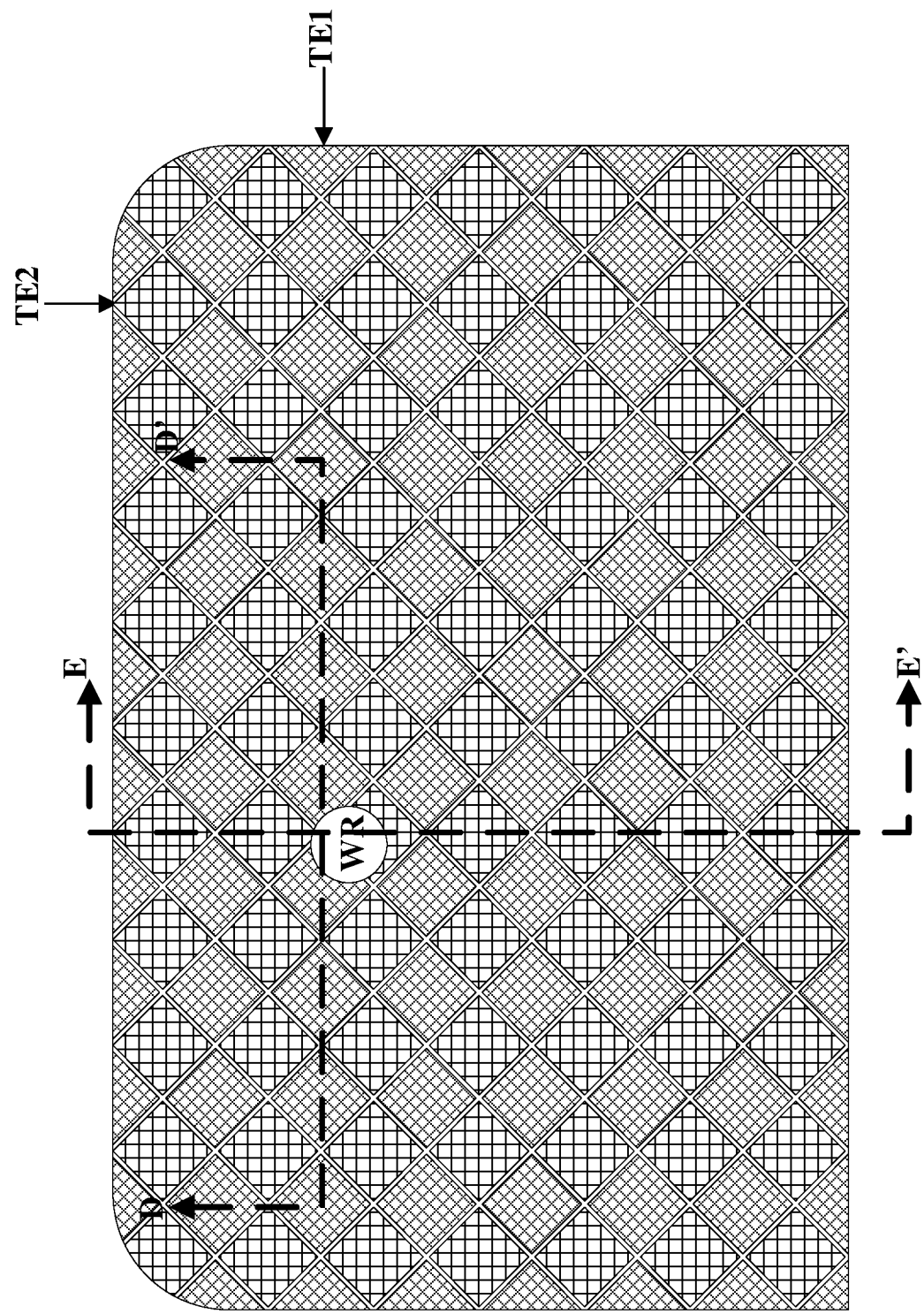
FIG. 9A is a plan view of a display panel in some embodiments according to the present disclosure.
Figure 9B:
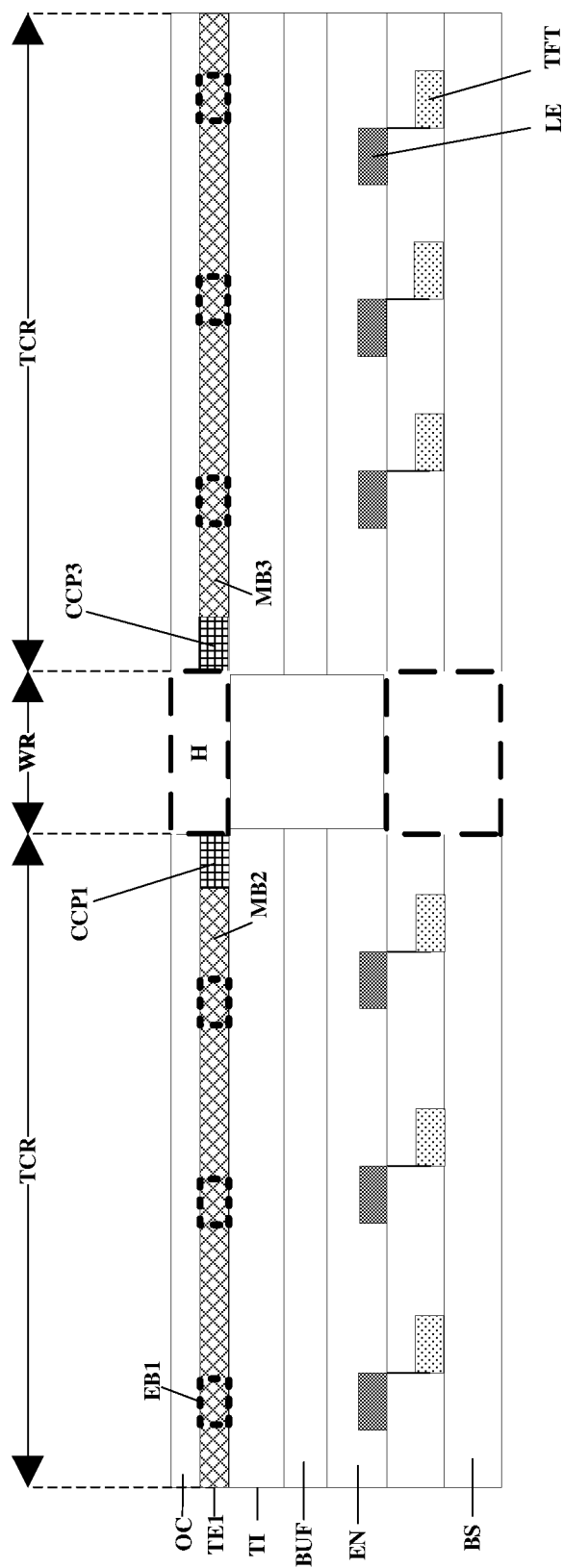
FIG. 9B is a cross-sectional view along a D-D' line in FIG. 9A.
Figure 9C:
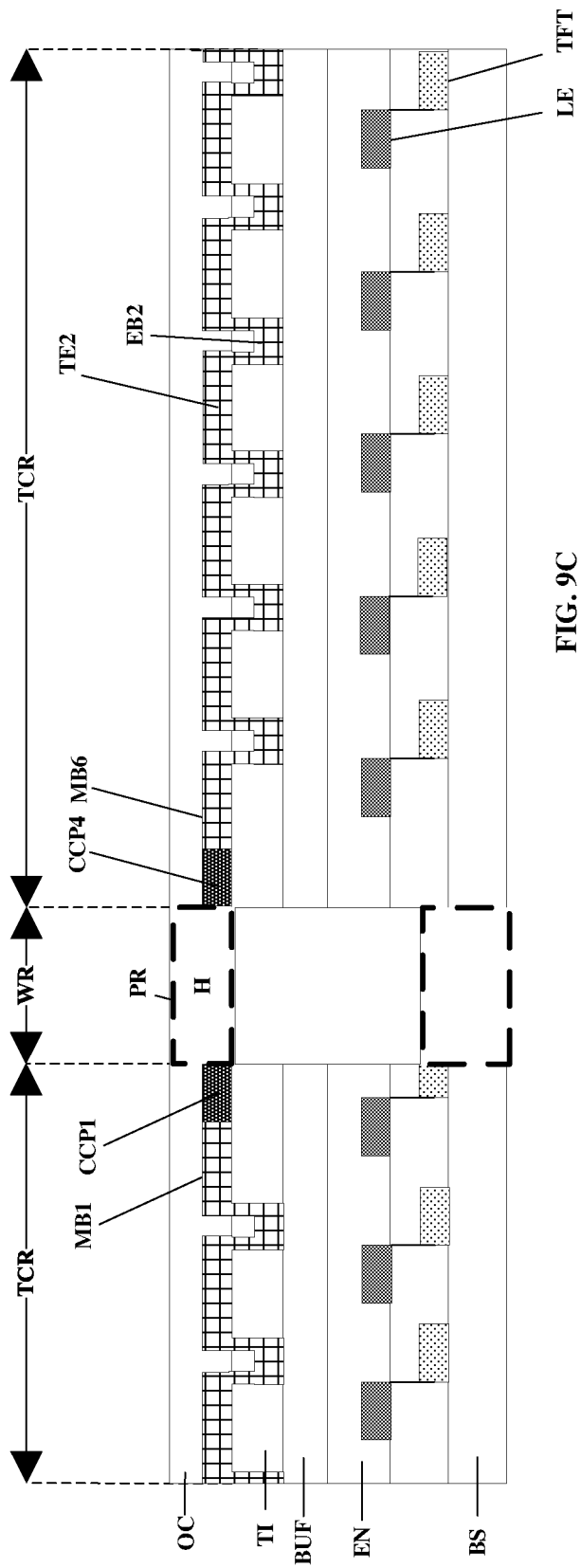
FIG. 9C is a cross-sectional view along an E-E' line in FIG. 9A.

FIG. 9A is a plan view of a display panel in some embodiments according to the present disclosure. FIG. 9B is a cross-sectional view along a D-D' line in FIG. 9A. FIG. 9C is a cross-sectional view along an E-E' line in FIG. 9A. Referring to FIGS. 9A to 9C, the display panel in some embodiments includes a touch control region TCR configured to detecting a touch, and a window region WR surrounded by the touch control region TCR. The touch control structure is limited in the touch control region TCR and absent in the window region WR. Optionally, the touch control region TCR substantially overlaps with a display region of the display panel. The display panel is configured to display an image in at least a portion of the touch control region TCR. In one example, in the window region WR, display elements of the display panel and the touch control structure are both absent; in the display region or at least a portion of the touch control region TCR, both display elements of the display panel and the touch control structure are present.

Referring to FIG. 9B and FIG. 9C, the display panel in some embodiments includes a hole H in the window region WR. In some embodiments, the hole H is a blind hole that does not completely extends through at least one layer of the display panel. In some embodiments, the hole H is a through-hole that completely extends through the display panel. The display panel in some embodiments further includes an accessory in the hole H. Examples of accessories include a camera lens and a fingerprint sensor.

Referring to FIG. 9B and FIG. 9C, the touch control structure in some embodiments further includes a plurality of first electrode bridges EB1 respectively connecting pairs of adjacent first mesh electrodes; and a plurality of second electrode bridges EB2 respectively connecting pairs of adjacent second mesh electrodes. Optionally, the plurality of first electrode bridges EB1, mesh blocks of the plurality of first mesh electrodes TE1, and mesh blocks of the plurality of second mesh electrodes TE2 are in a same layer. The plurality of second electrode bridges EB2 is spaced apart from the mesh blocks of the plurality of first mesh electrodes TE1 and mesh blocks of the plurality of second mesh electrodes TE2 by the touch insulating layer TI.

In some embodiments, display elements and thin film transistors are absent in the window region WR. Optionally, the display elements includes a plurality of light emitting diodes, for example, in an organic light emitting diode display panel. Optionally, the display elements include a liquid crystal layer in a plurality of subpixels, for example, in a liquid crystal display panel. Referring to FIG. 9B and FIG. 9C, in some embodiments, the display panel includes a base substrate BS, a plurality of thin film transistors TFT on the base substrate BS, and a plurality of light emitting elements LE on the base substrate BS and respectively connected to the plurality of thin film transistors TFT. Optionally, the plurality of thin film transistors TFT are absent in the window region WR. Optionally, the plurality of light emitting elements LE are absent in the window region WR.

Referring to FIG. 9B and FIG. 9C, in some embodiments, the display panel further includes an encapsulating layer EN encapsulating the plurality of light emitting elements LE. Optionally, the encapsulating layer EN is present in the touch control region TCR (or the display region), and is absent in the window region WR. In some embodiments, the counter substrate CS includes a buffer layer BUF and a touch insulating layer TI on the buffer layer BUF. Optionally, the buffer layer BUF is present in the touch control region TCR (or the display region), and is absent in the window region WR. Optionally, the touch insulating layer TI is present in both the touch control region TCR and the window region WR.

Figure 10A:
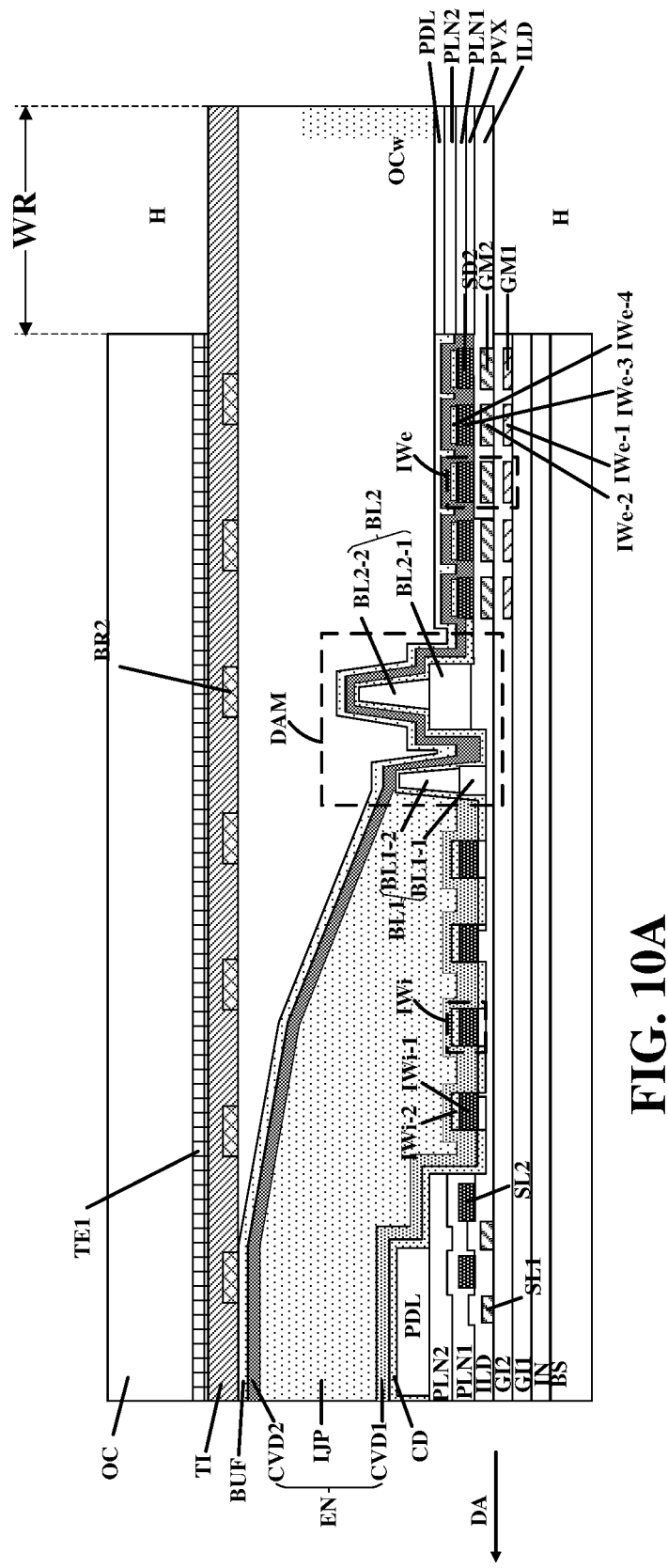
FIG. 10A illustrates a detailed structure in a region transitioning from a display region to a window region in a display panel in some embodiments according to the present disclosure.

FIG. 10A illustrates a detailed structure in a region transitioning from a display region to a window region in a display panel in some embodiments according to the present disclosure. Referring to FIG. 10A, in some embodiments, the region transitioning from a display region to a window region WR (e.g., a first window region WR1 or a second window region WR2) includes a base substrate BS (e.g., a flexible base substrate); an insulating layer IN on the base substrate BS; a first gate insulating layer GI1 on a side of the insulating layer IN away from the base substrate BS; a first gate metal layer GM1 on a side of the first gate insulating layer GI1 away from the insulating layer IN; a second gate insulating layer GI2 on a side of the first gate metal layer GM1 away from the first gate insulating layer GI1; a second gate metal layer GM2 on a side of the second gate insulating layer GI2 away from the first gate insulating layer GI1; an inter-layer dielectric layer ILD on a side of the second gate metal layer GM2 away from the second gate insulating layer GI2; a second SD metal layer SD2 on a side of the inter-layer dielectric layer ILD away from the second gate insulating layer GI2; a second planarization layer PLN2 on a side of the second SD metal layer SD2 away from the inter-layer dielectric layer ILD, a pixel definition layer PDL defining a plurality of subpixel regions for the plurality of light emitting elements LE, the pixel definition layer PDL on a side of the second planarization layer PLN2 away from the base substrate BS; a cathode layer CD on a side the pixel definition layer PDL, the second planarization layer PLN2, and the second SD metal layer SD2 away from the base substrate BS; an encapsulating layer EN encapsulating the plurality of light emitting elements, and on a side of the cathode layer CD away from the base substrate BS. The encapsulating layer EN in some embodiments includes a first inorganic encapsulating sub-layer CVD1 on a side of the cathode layer CD away from the base substrate BS, an organic encapsulating sub-layer UP on a side of the first inorganic encapsulating sub-layer CVD1 away from the base substrate BS, and a second inorganic encapsulating sub-layer CVD2 on a side of the organic encapsulating sub-layer UP away from the first inorganic encapsulating sub-layer CVD1. Optionally, the display panel, in the region transitioning from the display region DR to the window region WR, further includes a passivation layer between the inter-layer dielectric layer ILD and the second planarization layer PLN2. Optionally, the region transitioning from a display region to a window region WR further includes a light emitting material layer on a side of the cathode layer CD closer to the base substrate BS.

In some embodiments, the display panel, in the region transitioning from the display region DR to the window region WR, includes a barrier structure DAM completely surrounding a hole H (e.g., the first hole H1 or the second hole H2). In some embodiment, the barrier structure DAM includes a first barrier layer BL1 and a second barrier layer BL2 sequentially surrounding the hole H. Optionally, the first barrier layer BL1 includes a first barrier sub-layer BL1-1 and a second barrier sub-layer BL1-2. Optionally, the second barrier layer BL2 includes a third barrier sub-layer BL2-1 and a fourth barrier sub-layer BL2-2. Optionally, the first barrier layer BL1-1 and the third barrier sub-layer BL2-1 are in a same layer and formed in a single patterning process. Optionally, the second barrier layer BL1-2 and the fourth barrier sub-layer BL2-2 are in a same layer and formed in a single patterning process. Optionally, the first barrier sub-layer BL1-1 has a thickness less than a thickness of the third barrier sub-layer BL2-1. Optionally, the first barrier sub-layer BL1-1, the third barrier sub-layer BL2-1 and the planarization layer PLN, are in a same layer and formed in a single patterning process. Optionally, the second barrier sub-layer BL1-2, the fourth barrier sub-layer BL2-2, and the pixel definition layer PDL are in a same layer and formed in a single patterning process.

In some embodiments, the display panel, in the region transitioning from the display region DR to the window region WR, further includes a spacer layer on a side of the pixel definition layer PDL away from the base substrate BS. Optionally, the first barrier layer BL1 further includes another sub-layer in a same layer as the spacer layer. Optionally, the second barrier layer BL2 further includes another sub-layer in a same layer as the spacer layer.

In some embodiments, the first barrier layer BL1 only includes the second barrier sub-layer BIL-2 but does not include the first barrier sub-layer BL1-1.

In some embodiments, the display panel further includes a plurality of internal isolation walls IWi in a region between the barrier structure DAM and the display region DA. A respective one of the plurality of internal isolation walls IWi includes a first internal wall sub-layer IWi-1 and a second internal wall sub-layer IWi-2. Optionally, the first internal wall sub-layer IWi-1 is a part of the second SD metal layer SD2. Optionally, the second internal wall sub-layer IWi-2 is in a same layer as, and optionally formed in a single patterning process as, the cathode layer CD. Optionally, a total number of the plurality of internal isolation walls Iwi is in a range of 2 to 6, e.g., 2, 3, 4, 5, or 6. Optionally, the respective one of the plurality of internal isolation walls further includes a third internal wall sub-layer, the third internal wall sub-layer between the first internal wall sub-layer IWi-1 and the second internal wall sub-layer IWi-2. Optionally, the third internal wall sub-layer is in a same layer as, and optionally formed in a single patterning process as, a light emitting material layer.

In some embodiments, the display panel further includes a plurality of external isolation walls IWe in a region between the barrier structure DAM and the window region WR. A respective one of the plurality of external isolation walls IWe includes a first external wall sub-layer IWe-1, a second external wall sub-layer IWe-2, a third external wall sub-layer IWe-3, and a fourth external wall sub-layer IWe-4. Optionally, the first external wall sub-layer IWe-1 is a part of the first gate metal layer GM1. Optionally, the second external wall sub-layer IWe-2 is a part of the second gate metal layer GM1. Optionally, the third external wall sub-layer IWe-3 is a part of the second SD metal layer SD2. Optionally, the fourth external wall sub-layer IWe-4 is in a same layer as, and optionally formed in a single patterning process as, the cathode layer CD. Optionally, a total number of the plurality of external isolation walls IWe is in a range of 2 to 20, e.g., 2, 3, 4, 5, 6, 7, 8, 9, 10, 11, 12, 13, 14, 15, 16, 17, 18, 19, or 20. Optionally, the respective one of the plurality of external isolation walls IWe further includes a fifth external wall sub-layer, the fifth external wall sub-layer between the third external wall sub-layer IWe-3 and the fourth external wall sub-layer IWe-4. Optionally, the fifth external wall sub-layer is in a same layer as, and optionally formed in a single patterning process as, a light emitting material layer.

In some embodiments, the display panel further includes a plurality of first signal lines SL1 and a plurality of second signal lines SL2 in the region transitioning from the display region DR to the window region WR. The plurality of first signal lines SL1 and the plurality of second signal lines SL2 are on a side of the plurality of internal isolation walls IWi away from the barrier structure DAM. Optionally, the plurality of first signal lines SL1 are in a same layer as the second gate metal layer GM2. Optionally, the plurality of second signal lines SL2 are in a same layer as the second SD metal layer SD2. In some embodiments, the display panel, in the region transitioning from the display region DR to the window region WR, further includes a plurality of third signal lines in a same layer as the first gate metal layer GM1.

In the window region WR, the display panel in some embodiments includes one or more layers selected from: an inter-layer dielectric layer ILD, a passivation layer PVX on the inter-layer dielectric layer a first planarization layer PLN1 on a side of the passivation layer PVX away from the inter-layer dielectric layer ILD, a second planarization layer PLN2 on a side of the first planarization layer PLN1 away from the passivation layer PVX, a pixel definition layer PDL on a side of the second planarization layer PLN2 away from the first planarization layer PLN1, a window overcoat layer OCw on a side of the pixel definition layer PDL away from the second planarization layer PLN2, and a touch insulating layer TI on a side of the window overcoat layer OCw away from the pixel definition layer PDL. Optionally, the window overcoat layer OCw extends from the region transitioning from the display region DR to the window region WR to an edge of the window region WR. Optionally, the window overcoat layer OCw extends further into a sub-region of the window region WR. Optionally, the window overcoat layer OCw extends throughout the window region WR.

Figure 10B:
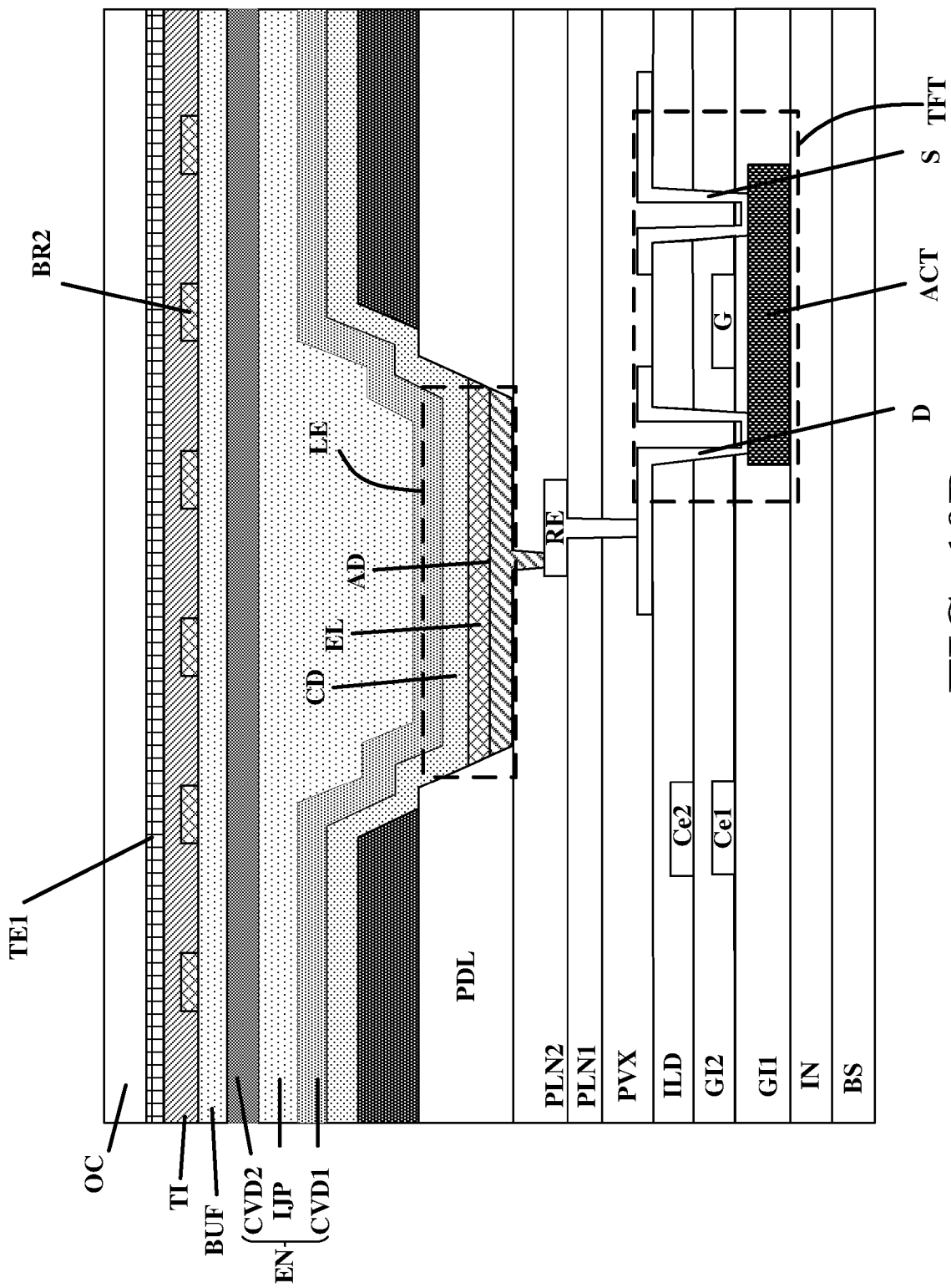
FIG. 10B illustrates a detailed structure in a display region in a display panel in some embodiments according to the present disclosure.

FIG. 10B illustrates a detailed structure in a display region in a display panel in some embodiments according to the present disclosure. Referring to FIG. 10B, the display panel in the display region in some embodiments includes a base substrate BS (e.g., a flexible base substrate); an insulating layer IN on the base substrate BS; an active layer ACT of a respective one of a plurality of thin film transistors TFT on a side of the insulating layer IN away from the base substrate BS; a first gate insulating layer GI1 on a side of the active layer ACT away from the base substrate BS; a gate electrode G and a first capacitor electrode Ce1 (both are parts of a first gate metal layer) on a side of the first gate insulating layer GI1 away from the insulating layer IN; a second gate insulating layer GI2 on a side of the gate electrode G and the first capacitor electrode Ce1 away from the first gate insulating layer GI1; a second capacitor electrode GI2 (a part of a second gate metal layer) on a side of the second gate insulating layer GI2 away from the first gate insulating layer GI1; an inter-layer dielectric layer ILD on a side of the second capacitor electrode Ce2 away from the second gate insulating layer GI2; a source electrode S and a drain electrode D (parts of a first SD metal layer) on a side of the inter-layer dielectric layer ILD away from the second gate insulating layer GI2; a passivation layer PVX on a side of the source electrode S and the drain electrode D away from the inter-layer dielectric layer ILD; a first planarization layer PLN1 on a side of the passivation layer PVX away from the inter-layer dielectric layer ILD; a second planarization layer PLN2 on side of the first planarization layer PLN1 away from the passivation layer PVX; a relay electrode RE (part of a second SD metal layer) on a side of the second planarization layer PLN2 away from the first planarization layer PLN1; a pixel definition layer PDL defining a subpixel aperture and on a side of the second planarization layer PLN2 away from the base substrate BS; and a light emitting element LE in the subpixel aperture. The light emitting element LE includes an anode AD on a side of the second planarization layer PLN2 away from the first planarization layer PLN1; a light emitting layer EL on a side of the anode AD away from the second planarization layer PLN2; and a cathode layer CD on a side of the light emitting layer EL away from the anode AD. The display panel in the display region further includes an encapsulating layer EN encapsulating the dummy light emitting element DLE, and on a side of the cathode layer CD away from the base substrate BS. The encapsulating layer EN in some embodiments includes a first inorganic encapsulating sub-layer CVD1 on a side of the cathode layer CD away from the base substrate BS, an organic encapsulating sub-layer HP on a side of the first inorganic encapsulating sub-layer CVD1 away from the base substrate BS, and a second inorganic encapsulating sub-layer CVD2 on a side of the organic encapsulating sub-layer IJP away from the first inorganic encapsulating sub-layer CVD1. The display panel in the display region further includes a buffer layer BUF on a side of the encapsulating layer EN away from the base substrate BS; a plurality of second electrode bridges BR2 on a side of the buffer layer BUF away from the encapsulating layer EN; a touch insulating layer TI on a side of the plurality of second electrode bridges BR2 away from the buffer layer BUF; a plurality of first touch electrodes TE1 on a side of the touch insulating layer TI away from the buffer layer BUF; and an overcoat layer OC on a side of the plurality of first touch electrodes TE1 away from the touch insulating layer TI. Optionally, the display panel in the display region does not include the passivation layer PVX, e.g., the inter-layer dielectric layer ILD is in direct contact with the first planarization layer PLN1

Figure 10C:
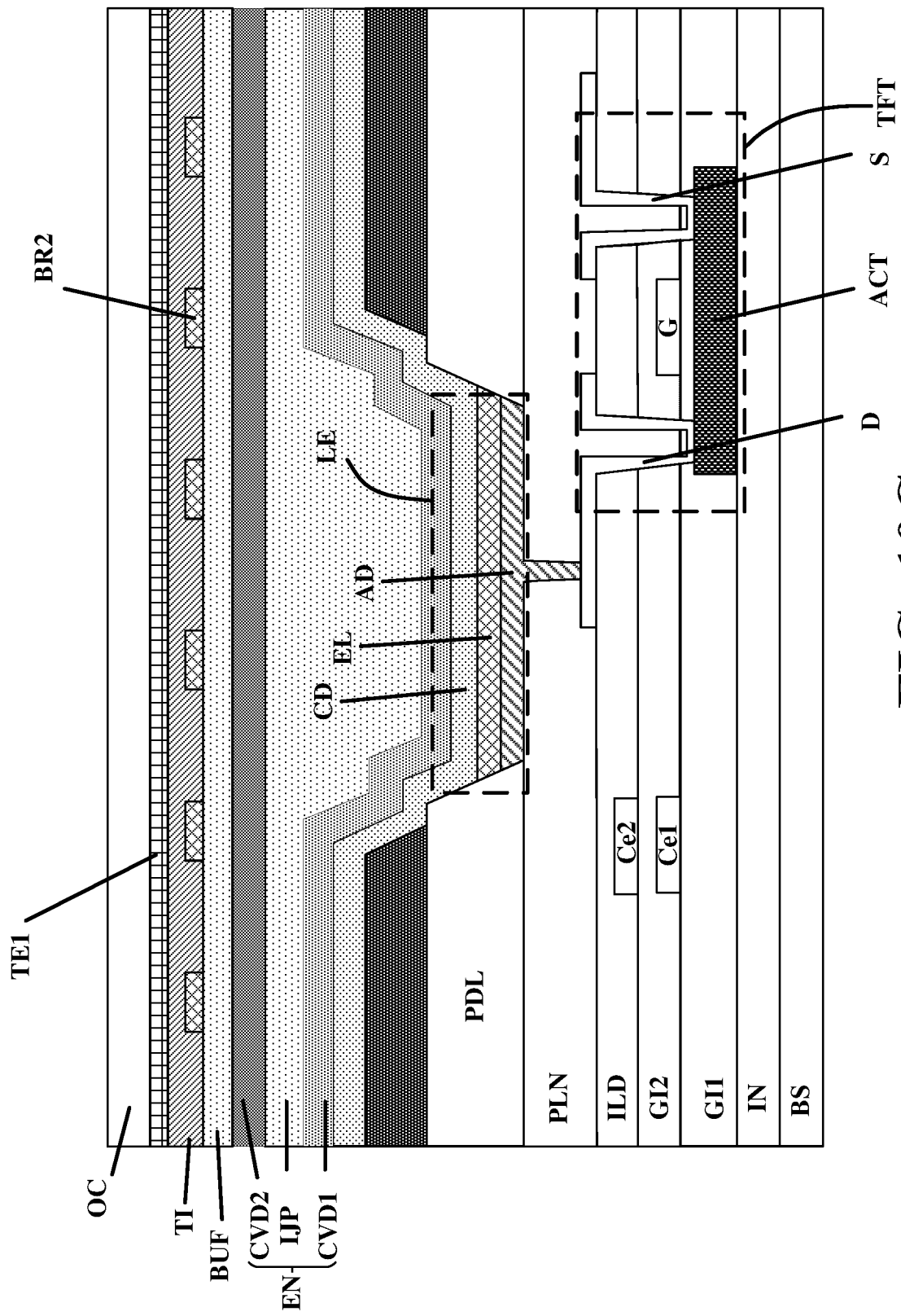
FIG. 10C illustrates a detailed structure in a display region in a display panel in some embodiments according to the present disclosure.

FIG. 10C illustrates a detailed structure in a display region in a display panel in some embodiments according to the present disclosure. Referring to FIG. 10C, the display panel in the display region in some embodiments includes a base substrate BS (e.g., a flexible base substrate); an insulating layer IN on the base substrate BS; an active layer ACT of a respective one of a plurality of thin film transistors TFT on a side of the insulating layer IN away from the base substrate BS; a first gate insulating layer GI1 on a side of the active layer ACT away from the base substrate BS, a gate electrode G and a first capacitor electrode Ce1 (both are parts of a first gate metal layer) on a side of the first gate insulating layer GI1 away from the insulating layer IN; a second gate insulating layer GI2 on a side of the gate electrode G and the first capacitor electrode Ce1 away from the first gate insulating layer GI1; a second capacitor electrode Ce2 (a part of a second gate metal layer) on a side of the second gate insulating layer GI2 away from the first gate insulating layer GI1; an inter-layer dielectric layer ILD on a side of the second capacitor electrode Ce2 away from the second gate insulating layer GI2; a source electrode S and a drain electrode D on a side of the inter-layer dielectric layer ILD away from the second gate insulating layer GI2; a planarization layer PLN on a side of the source electrode S and the drain electrode D away from the inter-layer dielectric layer ILD; a pixel definition layer PDL defining a subpixel aperture and on a side of the planarization layer PLN away from the base substrate BS; and a light emitting element LE in the subpixel aperture. The light emitting element LE includes an anode AD on a side of the planarization layer PLN away from the inter-layer dielectric layer ILD; a light emitting layer EL on a side of the anode AD away from the planarization layer PLN; and a cathode layer CD on a side of the light emitting layer EL away from the anode AD. The display panel in the display region further includes an encapsulating layer EN encapsulating the dummy light emitting element DLE, and on a side of the cathode layer CD away from the base substrate BS. The encapsulating layer EN in some embodiments includes a first inorganic encapsulating sub-layer CVD1 on a side of the cathode layer CD away from the base substrate BS, an organic encapsulating sub-layer IJP on a side of the first inorganic encapsulating sub-layer CVD1 away from the base substrate BS, and a second inorganic encapsulating sub-layer CVD2 on a side of the organic encapsulating sub-layer IJP away from the first inorganic encapsulating sub-layer CVD1. The display panel in the display region further includes a buffer layer BUF on a side of the encapsulating layer EN away from the base substrate BS; a plurality of second electrode bridges BR2 on a side of the buffer layer BUF away from the encapsulating layer EN; a touch insulating layer TI on a side of the plurality of second electrode bridges BR2 away from the buffer layer BUF; a plurality of first touch electrodes TE1 on a side of the touch insulating layer TI away from the buffer layer BUF; and an overcoat layer OC on a side of the plurality of first touch electrodes TE1 away from the touch insulating layer TI.

In another aspect, the present disclosure provides a display apparatus including a display panel described herein or fabricated by a method described herein, and one or more integrated circuits connected to the display panel. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

In another aspect, the present disclosure provides a method of fabricating a touch control structure. The touch control structure is formed to be limited in a touch control region and absent in a window region surrounded by the touch control region. In some embodiments, forming the touch control structure includes forming plurality of first mesh electrodes and forming a plurality of second mesh electrodes. In some embodiments, forming the touch control structure includes forming a plurality of window-adjacent mesh blocks and forming a plurality of capacitance-compensating conductive plates. Optionally, a respective one of the plurality of capacitance-compensating plates is formed to be directly connected to at least one mesh line (e.g., multiple mesh lines) of a respective one of the plurality of window-adjacent mesh blocks. Optionally, the plurality of capacitance-compensating plates are formed to respectively surround a plurality of portions of a periphery of the window region.

In some embodiments, an occupied area of the respective one of the plurality of capacitance-compensating plates is correlated to a reduction in an occupied area of the respective one of the plurality of window-adjacent mesh blocks relative to an internal mesh block electrically connected to the respective one of the plurality of window-adjacent mesh blocks, the internal mesh block spaced apart from the window region by the respective one of the plurality of window-adjacent mesh blocks. Optionally, a ratio of occupied areas of respective two of the plurality of capacitance-compensating conductive plates is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of reductions in occupied areas of respective two of the plurality of window-adjacent mesh blocks respectively connected to the respective two of the plurality of capacitance-compensating conductive plates; the reductions in occupied areas are respectively relative to respective two internal mesh blocks respectively electrically connected to the respective two of the plurality of window-adjacent mesh blocks; and the two internal mesh blocks are respectively spaced apart from the window region respectively by the respective two of the plurality of window-adjacent mesh blocks.

In some embodiments, forming the plurality of window-adjacent mesh blocks includes forming one or more first type window-adjacent mesh blocks that are parts of the plurality of first mesh electrodes, and forming one or more second type window-adjacent mesh blocks that are parts of the plurality of second mesh electrodes. Optionally, forming the plurality of capacitance-compensating plates includes forming one or more first type capacitance-compensating plates respectively connected to the one or more first type window-adjacent mesh blocks, and forming one or more second type capacitance-compensating plates respectively connected to the one or more second type window-adjacent mesh blocks. Optionally, an occupied area of the respective one of the plurality of capacitance-compensating plates is correlated to a reduction in an occupied area of the respective one of the plurality of window-adjacent mesh blocks; the reduction in the occupied area with respect to a respective one of the one or more first type window-adjacent mesh blocks is a difference between an occupied area of the respective one of the one or more first type window-adjacent mesh blocks and an average occupied area of mesh blocks of the plurality of first mesh electrodes that are spaced apart from the window region and edges of the touch control structure; and the reduction in the occupied area with respect to a respective one of the one or more second type window-adjacent mesh blocks is a difference between an occupied area of the respective one of the one or more second type window-adjacent mesh blocks and an average occupied area of mesh blocks of the plurality of second mesh electrodes that are spaced apart from the window region and edges of the touch control structure. Optionally, a ratio of occupied areas of respective two of the plurality of capacitance-compensating conductive plates is within 50% (e.g., within 45%, within 40%, within 35%, within 30%, within 25%, within 20%, within 18%, within 16%, within 14%, within 12%, within 10%, within 8%, within 6%, within 4%, within 2%, or within 1%) of a ratio of reductions in occupied areas of respective two of the plurality of window-adjacent mesh blocks respectively connected to the respective two of the plurality of capacitance-compensating conductive plates; a reduction in the occupied area with respect to a respective one of the one or more first type window-adjacent mesh blocks is a difference between an occupied area of the respective one of the one or more first type window-adjacent mesh blocks and an average occupied area of mesh blocks of the plurality of first mesh electrodes that are spaced apart from the window region and edges of the touch control structure; and a reduction in the occupied area with respect to a respective one of the one or more second type window-adjacent mesh blocks is a difference between an occupied area of the respective one of the one or more second type window-adjacent mesh blocks and an average occupied area of mesh blocks of the plurality of second mesh electrodes that are spaced apart from the window region and edges of the touch control structure.

In some embodiments, forming the plurality of window-adjacent mesh blocks includes forming a first mesh block surrounding a first portion of the periphery of the window region and forming a second mesh block surrounding a second portion of the periphery of the window region. Optionally, the first portion and the second portion are sequential non-overlapping portions of the periphery of the window region. Optionally, forming the plurality of capacitance-compensating conductive plates includes forming a first capacitance-compensating conductive plate directly connected to at least one mesh line (e.g., multiple mesh lines) of the first mesh block and spaced apart from the second mesh block. Optionally, the first capacitance-compensating conductive plate is formed to surround a third portion of the periphery of the window region. Optionally, the third portion at least partially overlaps with the first portion and at least partially overlaps with the second portion. Optionally, the method further includes forming a plurality of mesh fill patterns. Optionally, forming the plurality of mesh fill patterns includes forming a window-adjacent mesh fill pattern surrounding a fourth portion of the periphery of the window region. Optionally, the window-adjacent mesh fill pattern is formed to be surrounded by the second mesh blocks on sides other than a side surrounding the fourth portion of the periphery of the window region. Optionally, the third portion at least partially overlaps with the fourth portion. Optionally, the first portion, the second portion, and the fourth portion are sequential non-overlapping portions of the periphery of the window region. Optionally, the second mesh block is formed to further surround a fifth portion of the periphery of the window region. Optionally, the first portion, the second portion, the fourth portion, and the fifth portion are sequential non-overlapping portions of the periphery of the window region. Optionally, the third portion is non-overlapping with the fifth portion. Optionally, forming the plurality of capacitance-compensating conductive plates further includes forming a second capacitance-compensating conductive plate directly connected to at least one mesh line (e.g., multiple mesh lines) of the second mesh block. Optionally, the second capacitance-compensating conductive plate is formed to surround the fifth portion of the periphery of the window region.

In some embodiments, forming the plurality of window-adjacent mesh blocks includes forming a third mesh block surrounding a sixth portion of the periphery of the window region and forming a fourth mesh block surrounding a seventh portion of the periphery of the window region. Optionally, forming the plurality of capacitance-compensating conductive plates includes forming a third capacitance-compensating conductive plate directly connected to at least one mesh line (e.g., multiple mesh lines) of the third mesh block and directly connected to at least one mesh line (e.g., multiple mesh lines) of the fourth mesh block. Optionally, the third capacitance-compensating conductive plate is formed to surround an eighth portion of the periphery of the window region. Optionally, the eighth portion at least partially overlaps with the sixth portion and at least partially overlaps with the seventh portion. Optionally, the method further includes forming a first dummy plate surrounding the seventh portion of the periphery of the window region. Optionally, the first dummy plate is formed to be spaced apart from the fourth mesh block and spaced apart from the third capacitance-compensating conductive plate. Optionally, a ninth portion of the periphery of the window region, where the seventh portion and the eighth portion overlap with each other, is surrounded by a part of the first dummy plate, and is also surrounded by a part of the third capacitance-compensating conductive plate. Optionally, forming the plurality of window-adjacent mesh blocks includes forming a fifth mesh block surrounding a tenth portion of the periphery of the window region. Optionally, the seventh portion, the tenth portion, and the sixth portion are sequential non-overlapping portions of the periphery of the window region. Optionally, the tenth portion is a sub-portion of the eighth portion. Optionally, the fifth mesh block is formed to be spaced apart from the third capacitance-compensating conductive plate surrounding the tenth portion.

In some embodiments, forming the plurality of window-adjacent mesh blocks includes forming a first mesh block surrounding a first portion of the periphery of the window region and forming a fifth mesh block surrounding a tenth portion of the periphery of the window region. Optionally, the method further includes forming a conductive bridge directly connected to the first mesh block and directly connected to the fifth mesh block. Optionally, the method further includes forming a touch insulating layer, the touch insulating layer formed between the first mesh block and the conductive bridge, and between the fifth mesh block and the conductive bridge. Optionally, the first mesh block and the fifth mesh block are formed in a same layer using a same material. Optionally, the conductive bridge is formed to extend respectively through vias in the touch insulating layer to respectively connected to mesh lines of the first mesh block and the fifth mesh block. Optionally, the conductive bridge is formed to surround an eleventh portion of the periphery of the window region. Optionally, the eleventh portion partially overlaps with the first portion, and at least partially overlaps with the tenth portion.

In some embodiments, forming the plurality of window-adjacent mesh blocks includes forming a sixth mesh block surrounding a twelfth portion of the periphery of the window region. Optionally, forming the plurality of capacitance-compensating conductive plates includes forming a fourth capacitance-compensating conductive plate directly connected to at least one mesh line (e.g., multiple mesh lines)

of the sixth mesh block. Optionally, the fourth capacitance-compensating conductive plate is formed to surround a thirteenth portion of the periphery of the window region. Optionally, the method further includes forming a second dummy plate surrounding a fourteenth portion of the periphery of the window region. Optionally, the second dummy plate is formed to be spaced apart from the sixth mesh block. Optionally, the thirteen portion and the fourteen portion are sub-portions of the twelfth portion.

In some embodiments, the method further includes forming a light shielding ring between the window region and the plurality of capacitance-compensating plates. Optionally, the light shielding ring is formed to substantially surround the periphery of the window region.

In some embodiments, the method further includes forming a window overcoat layer in the window region.

Various appropriate materials and various appropriate fabricating methods may be used for making the capacitance compensating plate, the dummy plate, and the light shielding layer. For example, a metallic material may be deposited on the substrate by a plasma-enhanced chemical vapor deposition (PECVD) process. Examples of appropriate metallic materials for making the capacitance compensating plate, the dummy plate, and the light shielding layer include, but are not limited to, aluminum, chromium, tungsten, titanium, tantalum, molybdenum, copper, and alloys or laminates containing the same.

Various appropriate conductive electrode material may be used for making the mesh electrode pattern of the touch control structure in the present disclosure. In some embodiments, the conductive electrode material for making the mesh electrode pattern is a transparent conductive electrode material. Examples of conductive electrode materials for making the mesh electrode pattern of the touch electrode layer include, but are not limited to, a metal mesh, a silver nano wire, a carbon nano tube, a nano mesh, graphene, and conductive polymers such as poly(3,4-ethylenedioxythiophene) polystyrene sulfonate (PEDOT:PSS). Optionally, the mesh electrode pattern is made of a metal mesh such as a nano-silver mesh.

Various appropriate conductive electrode material may be used for making the overcoat layer and the window overcoat layer in the present disclosure. For example, a metallic material may be deposited on the substrate by a plasma-enhanced chemical vapor deposition (PECVD) process, and patterned by lithography. Examples of conductive electrode materials for making the overcoat layer and the window overcoat layer include, but are not limited to, silicon nitride ($SiN_x$), silicon oxide ($SiO_x$), or silicon oxynitride ($SiO_xN_y$).

In another aspect, the present disclosure provides a method of fabricating a display apparatus. In some embodiments, the method includes forming a display panel and forming a touch control structure on the display panel; and removing the touch control structure and display elements in a window region. Optionally, subsequent to removing the touch control structure and the display elements in the window region, the display apparatus includes, in the window region, at least one of an inter-layer dielectric layer; a passivation layer on the inter-layer dielectric layer; a first planarization layer on a side of the passivation layer away from the inter-layer dielectric layer; a second planarization layer on a side of the first planarization layer away from the passivation layer; a pixel definition layer on a side of the second planarization layer away from the first planarization layer; a window overcoat layer on a side of the pixel definition layer away from the second planarization layer; and a touch insulating layer on a side of the window overcoat layer away from the pixel definition layer.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch control structure, comprising a plurality of first mesh electrodes and a plurality of second mesh electrodes;
   wherein the touch control structure is limited in a touch control region and absent in a window region surrounded by the touch control region;
   the touch control structure comprises a plurality of window-adjacent mesh blocks and a plurality of capacitance-compensating conductive plates;
   a respective one of the plurality of capacitance-compensating conductive plates is directly connected to at least one mesh line of a respective one of the plurality of window-adjacent mesh blocks; and
   the plurality of capacitance-compensating conductive plates respectively surround a plurality of portions of a periphery of the window region;
   wherein the plurality of window-adjacent mesh blocks comprise a third mesh block surrounding a sixth portion of the periphery of the window region and a fourth mesh block surrounding a seventh portion of the periphery of the window region;
   the plurality of capacitance-compensating conductive plates comprise a third capacitance-compensating conductive plate directly connected to at least one mesh line of the third mesh block and directly connected to at least one mesh line of the fourth mesh block;
   the third capacitance-compensating conductive plate surrounds an eighth portion of the periphery of the window region; and the eighth portion at least partially overlaps with the sixth portion and at least partially overlaps with the seventh portion;

wherein the touch control structure further comprises a first dummy plate surrounding the seventh portion of the periphery of the window region;

wherein the first dummy plate is spaced apart from the fourth mesh block and spaced apart from the third capacitance-compensating conductive plate; and a ninth portion of the periphery of the window region, where the seventh portion and the eighth portion overlap with each other, is surrounded by a part of the first dummy plate, and is also surrounded by a part of the third capacitance-compensating conductive plate.

2. The touch control structure of claim 1, wherein an occupied area of the respective one of the plurality of capacitance-compensating conductive plates is correlated to a reduction in an occupied area of the respective one of the plurality of window-adjacent mesh blocks relative to an internal mesh block electrically connected to the respective one of the plurality of window-adjacent mesh blocks, the internal mesh block spaced apart from the window region by the respective one of the plurality of window-adjacent mesh blocks.

3. The touch control structure of claim 1, wherein a ratio of occupied areas of respective two of the plurality of capacitance-compensating conductive plates is within 50% of a ratio of reductions in occupied areas of respective two of the plurality of window-adjacent mesh blocks respectively connected to the respective two of the plurality of capacitance-compensating conductive plates;

the reductions in occupied areas are respectively relative to respective two internal mesh blocks respectively electrically connected to the respective two of the plurality of window-adjacent mesh blocks; and the two internal mesh blocks are respectively spaced apart from the window region respectively by the respective two of the plurality of window-adjacent mesh blocks.

4. The touch control structure of claim 1, wherein the plurality of window-adjacent mesh blocks comprise one or more first type window-adjacent mesh blocks that are parts of the plurality of first mesh electrodes, and one or more second type window-adjacent mesh blocks that are parts of the plurality of second mesh electrodes; and the plurality of capacitance-compensating conductive plates comprise one or more first type capacitance-compensating conductive plates respectively connected to the one or more first type window-adjacent mesh blocks, and one or more second type capacitance-compensating conductive plates respectively connected to the one or more second type window-adjacent mesh blocks.

5. The touch control structure of claim 4, wherein an occupied area of the respective one of the plurality of capacitance-compensating conductive plates is correlated to a reduction in an occupied area of the respective one of the plurality of window-adjacent mesh blocks;

the reduction in the occupied area with respect to a respective one of the one or more first type window-adjacent mesh blocks is a difference between an occupied area of the respective one of the one or more first type window-adjacent mesh blocks and an average occupied area of mesh blocks of the plurality of first mesh electrodes that are spaced apart from the window region and edges of the touch control structure; and the reduction in the occupied area with respect to a respective one of the one or more second type window-adjacent mesh blocks is a difference between an occupied area of the respective one of the one or more second type window-adjacent mesh blocks and an average occupied area of mesh blocks of the plurality of second mesh electrodes that are spaced apart from the window region and edges of the touch control structure.

6. The touch control structure of claim 4, wherein a ratio of occupied areas of respective two of the plurality of capacitance-compensating conductive plates is within 50% of a ratio of reductions in occupied areas of respective two of the plurality of window-adjacent mesh blocks respectively connected to the respective two of the plurality of capacitance-compensating conductive plates;

a reduction in the occupied area with respect to a respective one of the one or more first type window-adjacent mesh blocks is a difference between an occupied area of the respective one of the one or more first type window-adjacent mesh blocks and an average occupied area of mesh blocks of the plurality of first mesh electrodes that are spaced apart from the window region and edges of the touch control structure; and a reduction in the occupied area with respect to a respective one of the one or more second type window-adjacent mesh blocks is a difference between an occupied area of the respective one of the one or more second type window-adjacent mesh blocks and an average occupied area of mesh blocks of the plurality of second mesh electrodes that are spaced apart from the window region and edges of the touch control structure.

7. The touch control structure of claim 1, wherein the plurality of window-adjacent mesh blocks comprise a first mesh block surrounding a first portion of the periphery of the window region and a second mesh block surrounding a second portion of the periphery of the window region;

the first portion and the second portion are sequential non-overlapping portions of the periphery of the window region;

the plurality of capacitance-compensating conductive plates comprise a first capacitance-compensating conductive plate directly connected to at least one mesh line of the first mesh block and spaced apart from the second mesh block;

the first capacitance-compensating conductive plate surrounds a third portion of the periphery of the window region; and the third portion at least partially overlaps with the first portion and at least partially overlaps with the second portion.

8. The touch control structure of claim 7, further comprising a plurality of mesh fill patterns;

wherein the plurality of mesh fill patterns comprises a window-adjacent mesh fill pattern surrounding a fourth portion of the periphery of the window region.

9. The touch control structure of claim 8, wherein the window-adjacent mesh fill pattern is surrounded by the second mesh block on sides other than a side surrounding the fourth portion of the periphery of the window region;

the third portion at least partially overlaps with the fourth portion; and the first portion, the second portion, and the fourth portion are sequential non-overlapping portions of the periphery of the window region.

10. The touch control structure of claim 9, wherein the second mesh block further surrounds a fifth portion of the periphery of the window region;

the first portion, the second portion, the fourth portion, and the fifth portion are sequential non-overlapping portions of the periphery of the window region;

the third portion is non-overlapping with the fifth portion;

the plurality of capacitance-compensating conductive plates further comprise a second capacitance-compensating conductive plate directly connected to at least one mesh line of the second mesh block; and the second capacitance-compensating conductive plate surrounds the fifth portion of the periphery of the window region.

11. The touch control structure of claim 1, wherein the plurality of window-adjacent mesh blocks comprise a fifth mesh block surrounding a tenth portion of the periphery of the window region;

the seventh portion, the tenth portion, and the sixth portion are sequential non-overlapping portions of the periphery of the window region;

the tenth portion is a sub-portion of the eighth portion; and the fifth mesh block is spaced apart from the third capacitance-compensating conductive plate surrounding the tenth portion.

12. The touch control structure of claim 1, wherein the plurality of window-adjacent mesh blocks comprise a first mesh block surrounding a first portion of the periphery of the window region and a fifth mesh block surrounding a tenth portion of the periphery of the window region; and the touch control structure further comprises a conductive bridge directly connected to the first mesh block and directly connected to the fifth mesh block.

13. The touch control structure of claim 12, further comprising a touch insulating layer between the first mesh block and the conductive bridge, and between the fifth mesh block and the conductive bridge;

the first mesh block and the fifth mesh block are in a same layer; and the conductive bridge extends respectively through vias in the touch insulating layer to respectively connected to mesh lines of the first mesh block and the fifth mesh block.

14. The touch control structure of claim 12, wherein the conductive bridge surrounds an eleventh portion of the periphery of the window region; and the eleventh portion partially overlaps with the first portion, and at least partially overlaps with the tenth portion.

15. The touch control structure of claim 1, further comprising a light shielding ring between the window region and the plurality of capacitance-compensating conductive plates;

wherein the light shielding ring substantially surrounds the periphery of the window region.

16. The touch control structure of claim 1, wherein the plurality of window-adjacent mesh blocks comprise a second mesh block on a first side of the window region, a third mesh block on a second side of the window region, a first mesh block on a third side of the window region, and a sixth mesh block on a fourth side of the window region;

the plurality of capacitance-compensating conductive plates comprise a second capacitance-compensating conductive plate on the first side of the window region, a third capacitance-compensating conductive plate on the second side of the window region, a first capacitance-compensating conductive plate on the third side of the window region, and a fourth capacitance-compensating conductive plate on the fourth side of the window region;

the second capacitance-compensating conductive plate is directly connected to at least one mesh line of the second mesh block;

the third capacitance-compensating conductive plate is directly connected to at least one mesh line of the third mesh block;

the first capacitance-compensating conductive plate is directly connected to at least one mesh line of the first mesh block; and the fourth capacitance-compensating conductive plate is directly connected to at least one mesh line of the sixth mesh block.

17. A display apparatus, comprising the touch control structure of claim 1, a display panel with a hole in the window region, and an integrated circuit connected to the display panel;

wherein display elements of the display panel are absent in the window region; and the display panel is configured to display an image in at least a portion of the touch control region;

wherein the display apparatus comprises, in the window region, an inter-layer dielectric layer;

a passivation layer on the inter-layer dielectric layer;

a first planarization layer on a side of the passivation layer away from the inter-layer dielectric layer;

a second planarization layer on a side of the first planarization layer away from the passivation layer;

a pixel definition layer on a side of the second planarization layer away from the first planarization layer;

a window overcoat layer on a side of the pixel definition layer away from the second planarization layer; and a touch insulating layer on a side of the window overcoat layer away from the pixel definition layer.

18. A touch control structure, comprising a plurality of first mesh electrodes and a plurality of second mesh electrodes;

wherein the touch control structure is limited in a touch control region and absent in a window region surrounded by the touch control region;

the touch control structure comprises a plurality of window-adjacent mesh blocks and a plurality of capacitance-compensating conductive plates;

a respective one of the plurality of capacitance-compensating conductive plates is directly connected to at least one mesh line of a respective one of the plurality of window-adjacent mesh blocks; and the plurality of capacitance-compensating conductive plates respectively surround a plurality of portions of a periphery of the window region;

wherein the plurality of window-adjacent mesh blocks comprise a sixth mesh block surrounding a twelfth portion of the periphery of the window region;

the plurality of capacitance-compensating conductive plates comprise a fourth capacitance-compensating conductive plate directly connected to at least one mesh line of the sixth mesh block;

the fourth capacitance-compensating conductive plate surrounds a thirteenth portion of the periphery of the window region;

the touch control structure further comprises a second dummy plate surrounding a fourteenth portion of the periphery of the window region;

the second dummy plate is spaced apart from the sixth mesh block; and the thirteen portion and the fourteen portion are sub-portions of the twelfth portion.

\* \* \* \* \*